(12) United States Patent
Leong

(10) Patent No.: US 11,120,817 B2
(45) Date of Patent: Sep. 14, 2021

(54) SOUND RECOGNITION APPARATUS

(71) Applicant: David Tuk Wai Leong, Selangor (MY)

(72) Inventor: David Tuk Wai Leong, Selangor (MY)

(*) Notice: Subject to any disclaimer, the term of this patent is extended or adjusted under 35 U.S.C. 154(b) by 9 days.

(21) Appl. No.: 16/636,374

(22) PCT Filed: Aug. 25, 2017

(86) PCT No.: PCT/IB2017/001023
§ 371 (c)(1),
(2) Date: Feb. 4, 2020

(87) PCT Pub. No.: WO2019/038573
PCT Pub. Date: Feb. 28, 2019

(65) Prior Publication Data
US 2020/0168241 A1    May 28, 2020

(51) Int. Cl.
*G10L 25/51* (2013.01)
*H04R 3/04* (2006.01)

(52) U.S. Cl.
CPC .............. *G10L 25/51* (2013.01); *H04R 3/04* (2013.01)

(58) Field of Classification Search
CPC ....... G06F 1/3287; G10L 17/08; G10L 25/21; G10L 25/51; G10L 17/02; G10L 19/00; G10L 21/0208; G10L 25/78; G10L 25/84; H04L 67/1095; H04L 9/3297; H04R 3/04; B60R 25/1009; G08B 1/08; G09B 19/04; G16H 50/30; H04N 5/23245; H04N 21/41407; H05B 47/12
USPC ......... 330/129; 348/14.01; 379/67.1, 202.01, 379/402; 704/201, 231, 233, 234, 235, 704/236, 239, 243, 246, 254, 270.1, 275; 706/12
See application file for complete search history.

(56) References Cited

U.S. PATENT DOCUMENTS

| | | | | |
|---|---|---|---|---|
| 4,383,135 A | * | 5/1983 | Scott | G10L 15/00 704/235 |
| 4,712,242 A | | 12/1987 | Rajasekaren | |
| 5,105,465 A | * | 4/1992 | Koyama | G10L 15/07 704/239 |

(Continued)

FOREIGN PATENT DOCUMENTS

| EP | 0 202 404 | 11/1986 |
|---|---|---|
| JP | 2002 196784 | 7/2002 |

OTHER PUBLICATIONS

International Search Report dated May 14, 2018.

*Primary Examiner* — Gerald Gauthier
(74) *Attorney, Agent, or Firm* — Jacobson Holman PLLc

(57) ABSTRACT

A sound recognition apparatus (100) comprises a microphone (110) for capturing a posterior sound signal; and a processing circuit comprising a processor (180). The processing circuit is configured to process the posterior sound signal to derive posterior data, generate, using the processor (180), amalgamated data from the posterior data and anterior data derived from a previously captured anterior signal, determine, by the processor (180), whether there are correlations between the amalgamated data, the posterior data, and the anterior data that indicate that the posterior data matches the anterior data by comparing the posterior data and the amalgamated data, and the anterior data and the amalgamated data, and upon the posterior data matching the anterior data, output, by the processor (180), an indication that the posterior data matches the anterior data.

36 Claims, 7 Drawing Sheets

(56) References Cited

U.S. PATENT DOCUMENTS

| | | | | |
|---|---|---|---|---|
| 5,241,649 | A * | 8/1993 | Niyada | G10L 15/10 704/234 |
| 5,333,194 | A * | 7/1994 | Caesar | H04B 1/586 379/343 |
| 5,557,237 | A * | 9/1996 | Carpentier | H03G 3/32 330/129 |
| 5,794,204 | A * | 8/1998 | Miyazawa | G10L 15/075 704/244 |
| 6,535,848 | B1 * | 3/2003 | Ortega | G06F 16/685 704/235 |
| 6,766,294 | B2 * | 7/2004 | MacGinite | G10L 15/01 704/235 |
| 6,850,609 | B1 * | 2/2005 | Schrage | H04M 3/42221 379/158 |
| 7,103,154 | B1 * | 9/2006 | Cannon | H04M 1/6505 379/67.1 |
| 8,117,030 | B2 * | 2/2012 | Bushey | G10L 15/063 704/243 |
| 8,311,838 | B2 * | 11/2012 | Lindahl | G10L 15/22 704/270.1 |
| 8,856,049 | B2 * | 10/2014 | Vasilache | G10L 25/78 706/12 |
| 9,031,838 | B1 * | 5/2015 | Nash | H04M 3/2227 704/231 |
| 9,536,161 | B1 * | 1/2017 | Lish | H04N 5/23219 |
| 9,640,179 | B1 * | 5/2017 | Hart | G10L 15/20 |
| 9,792,908 | B1 * | 10/2017 | Bassemir | G06F 40/253 |
| 10,079,024 | B1 * | 9/2018 | Bhimanaik | G10L 17/06 |
| 10,235,993 | B1 * | 3/2019 | Bradley | G10L 17/08 |
| 10,373,608 | B2 * | 8/2019 | Zhang | G10L 21/0224 |
| 10,805,391 | B2 * | 10/2020 | Jiang | H04L 9/3297 |
| 2004/0210442 | A1 * | 10/2004 | Glynn | G06Q 10/06 704/275 |
| 2007/0035612 | A1 * | 2/2007 | Korneluk | H04N 7/173 348/14.01 |
| 2007/0106510 | A1 * | 5/2007 | Hsing | G16H 40/67 704/246 |
| 2009/0006087 | A1 * | 1/2009 | Imoto | G10L 15/26 704/231 |
| 2010/0220844 | A1 * | 9/2010 | Noldus | H04M 3/567 379/202.01 |
| 2011/0144980 | A1 * | 6/2011 | Rysenga | G06Q 10/109 704/201 |
| 2012/0245942 | A1 * | 9/2012 | Zechner | G10L 25/90 704/254 |
| 2014/0012587 | A1 * | 1/2014 | Park | H04W 12/06 704/275 |
| 2015/0066498 | A1 * | 3/2015 | Ma | H04R 29/004 704/233 |
| 2017/0084292 | A1 * | 3/2017 | Yoo | G10L 25/84 |
| 2017/0162205 | A1 * | 6/2017 | Melvin | G10L 17/22 |
| 2017/0213553 | A1 * | 7/2017 | Gunn | G06F 1/3206 |
| 2018/0033442 | A1 * | 2/2018 | Chang | H03G 3/3089 |
| 2018/0108369 | A1 * | 4/2018 | Gross | G07C 5/085 |
| 2018/0158288 | A1 * | 6/2018 | Logan | G01S 19/51 |
| 2018/0228006 | A1 * | 8/2018 | Baker | G10L 15/22 |
| 2019/0132372 | A1 * | 5/2019 | Litsyn | H04L 67/12 |
| 2020/0126645 | A1 * | 4/2020 | Robbins | H04L 63/0861 |
| 2020/0168241 | A1 * | 5/2020 | Leong | H04R 3/04 |

\* cited by examiner

SOUND RECOGNITION APPARATUS

FIELD

The present invention relates to sound recognition apparatus and a sound recognition method.

BACKGROUND

Sound recognition technology, as predominantly exemplified by voice recognition technology, has been around since the 1950s. Since then there have been tremendous advances in electronics, computer science, mathematics and linguistics that have enabled voice recognition technology to be more intuitive and responsive to users. Many modern solutions take advantage of the fact that extensive computing resources are relatively cheap to access. However, voice recognition remains very difficult to implement when resources are limited.

Voice recognition technology can be divided into three categories: (1) speech recognition; (2) speaker recognition; (3) language recognition. Speech recognition requires the system to identify the exact word or phrase spoken, in addition to being able to differentiate between similar sounding words (single words or multiple words) or distinguish between continuous speech and spontaneous speech. Speaker recognition requires the system to identify the individual speaker from other speakers by using relevant mathematical methods to characterise and analyse special features within the speaker's voice as words are spoken. Language recognition requires the system to determine the specific language of the speaker and apply speech and/or speaker recognition to determine the exact words that is spoken.

Voice recognition technology is usually a mixture of hardware and software components. The main components of voice recognition apparatus from a hardware perspective are: an analogue voice signal transducer (a microphone), an amplifier, an analogue filter, an analogue-to-digital converter (ADC) and a computer system. The main components from a software perspective for the computer system to process the digital voice signals is software for implementing features such as, Fourier transformation, digital filtering, matrix theory, data encoding/decoding, statistical modelling and analysis. Additionally, an understanding of linguistics is also required in order to: (1) interpret the computational results from the relationship between analogue and digital voice signals; (2) measure the performance of the voice recognition technology under various conditions. Modern voice recognition technology may substitute one or more hardware components with a software equivalent to reduce cost or improve precision using mathematics.

Once the voice signals has been converted to digital data, Digital Signal Processing (DSP) is applied to the signals. DSP is a specialised field of engineering mathematics used to process discrete signals. There are no limitations to the types of signals to which DSP can be applied, as long as the signals have been discretised and converted into digital data.

Modern implementation of voice recognition technology often employ statistical models and analysis techniques, because of its effectiveness in adapting to the peculiarities of human speech and to provide robustness in noisy environments.

There is a need for alternative methods of sound recognition and additional sound recognition systems/apparatuses, including a need for methods and systems for incorporating voice recognition functionality in even the simplest applications, giving users intuitive control of voice recognition functionality, and providing low-cost, low-power, low-complexity embedded system devices.

The invention aims to satisfy one or more of these needs.

SUMMARY

In a first broad aspect of the invention there is provided a sound recognition method comprising:
 capturing a posterior sound signal;
 processing the posterior sound signal to derive posterior data;
 generating amalgamated data from the posterior data and anterior data derived from a previously captured anterior sound signal; and
 determining whether there are correlations between the amalgamated data, the posterior data, and the anterior data that indicate that the posterior data matches the anterior data by comparing the posterior data and the amalgamated data, and the anterior data and the amalgamated data; and
 upon the posterior data matching the anterior data, outputting an indication that the posterior data matches the anterior data.

In an embodiment, the sound data is voice data.

In an embodiment, the posterior data comprises posterior sound data and posterior time stamp data, and the anterior data comprises anterior sound data and anterior time stamp data.

In an embodiment, generating amalgamated data comprises:
 generating amalgamated sound data from the posterior sound data and the anterior sound data; and
 generating amalgamated time stamp data from the posterior time stamp data and the anterior time stamp data.

In an embodiment, comparing the posterior data and the amalgamated data, and the anterior data and the amalgamated data comprises generating correlation coefficients between:
 amalgamated sound data and the posterior sound data;
 amalgamated sound data and the anterior sound data;
 amalgamated time stamp data and the posterior time stamp data;
 amalgamated time stamp data and the anterior time stamp data.

In an embodiment, the correlation coefficients are Pearson's coefficients.

In an embodiment, the method comprises applying decision logic based on the generated coefficients to determine whether there are correlations between the amalgamated data, the posterior data, and the anterior data that indicate that the posterior data matches the anterior data.

In an embodiment, the posterior data comprises positive posterior sound data, negative posterior sound data, positive posterior time stamp data and negative posterior time stamp data, and the anterior data comprises positive anterior sound data, negative anterior sound data, positive anterior time stamp data and negative anterior time stamp data.

In an embodiment, generating amalgamated data comprises:
 generating amalgamated positive sound data from the positive posterior sound data and the positive anterior sound data;
 generating amalgamated negative sound data from the negative posterior sound data and the negative anterior sound data;

generating amalgamated positive time stamp data from the positive posterior time stamp data and the positive anterior time stamp data; and
generating amalgamated negative time stamp data from the negative posterior time stamp data and the negative anterior time stamp data.

In an embodiment, comparing the posterior data and the amalgamated data, and the anterior data and the amalgamated data comprises generating correlation coefficients between:
amalgamated positive sound data and the positive posterior sound data;
amalgamated positive sound data and the positive anterior sound data;
amalgamated negative sound data and the negative posterior sound data; and
amalgamated negative sound data and the negative anterior sound data.

In an embodiment, comparing the posterior data and the amalgamated data, and the anterior data and the amalgamated data comprises generating correlation coefficients between:
amalgamated positive time stamp data and the positive posterior time stamp data;
amalgamated positive time stamp data and the positive anterior time stamp data;
amalgamated negative time stamp data and the negative posterior time stamp data; and
amalgamated negative time stamp data and the negative anterior time stamp data.

In an embodiment, generating further correlation coefficients from the correlation coefficients representing:
the amalgamated positive time stamp data and the positive posterior time stamp data, and the amalgamated positive time stamp data and the positive anterior time stamp data;
the amalgamated negative time stamp data and the negative posterior time stamp data, and the amalgamated negative time stamp data and the negative anterior time stamp data;
the amalgamated positive sound data and the positive posterior sound data, and the amalgamated positive sound data and the positive anterior sound data; and
the amalgamated negative sound data and the negative posterior sound data, and the amalgamated negative sound data and the negative anterior sound data.

In an embodiment, the correlation coefficients are Pearson's coefficients.

In an embodiment, the method comprises applying decision logic based on the generated coefficients to determine whether there are correlations between the amalgamated data, the posterior data, and the anterior data that indicate that the posterior data matches the anterior data.

In an embodiment, processing the captured posterior sound signal to derive posterior data comprises converting the captured signal into a square wave signal.

In an embodiment, processing the square wave signal to:
derive posterior sound data by storing a binary representation of transitions in the square wave signal; and
derive posterior time stamp data by storing data indicative of the time between transitions.

In an embodiment, processing the captured posterior sound signal comprises converting the positive half-cycle of the posterior sound signal into a first square wave signal, and the negative half-cycle of the posterior sound signal into a second square wave signal.

In an embodiment, the method comprises:
processing the first square wave signal to
derive positive posterior sound data by storing a binary representation of transitions in the square wave signal to form, and
derive positive posterior time stamp data by storing data indicative of the time between transitions; and
processing the second square wave signal to
derive negative posterior sound data by storing a binary representation of transitions in the square wave signal to form, and
derive negative posterior time stamp data by storing data indicative of the time between transitions.

In a second broad aspect, the invention provides a sound recognition apparatus comprising:
a microphone for capturing a posterior sound signal; and
a processing circuit comprising a processor, the processing circuit configured to:
process the posterior sound signal to derive posterior data;
generate, using the processor, amalgamated data from the posterior data and anterior data derived from a previously captured anterior signal; and
determine, by the processor, whether there are correlations between the amalgamated data, the posterior data, and the anterior data that indicate that the posterior data matches the anterior data by comparing the posterior data and the amalgamated data, and the anterior data and the amalgamated data; and
upon the posterior data matching the anterior data, output, by the processor, an indication that the posterior data matches the anterior data.

In an embodiment, the sound recognition apparatus comprises an indicator for outputting the indication.

In an embodiment, the sound data is voice data.

In an embodiment, the posterior data comprises posterior sound data and posterior time stamp data, and the anterior data comprises anterior sound data and anterior time stamp data.

In an embodiment, generating amalgamated data comprises the processor:
generating amalgamated sound data from the posterior sound data and the anterior sound data; and
generating amalgamated time stamp data from the posterior time stamp data and the anterior time stamp data.

In an embodiment, comparing the posterior data and the amalgamated data, and the anterior data and the amalgamated data comprises the processor generating correlation coefficients between:
amalgamated sound data and the posterior sound data;
amalgamated sound data and the anterior sound data;
amalgamated time stamp data and the posterior time stamp data;
amalgamated time stamp data and the anterior time stamp data.

In an embodiment, the correlation coefficients are Pearson's coefficients.

In an embodiment, the processor is configured to apply decision logic based on the generated coefficients to determine whether there are correlations between the amalgamated data, the posterior data, and the anterior data that indicate that the posterior data matches the anterior data.

In an embodiment, the posterior data comprises positive posterior sound data, negative posterior sound data, positive posterior time stamp data and negative posterior time stamp data, and the anterior data comprises positive anterior sound data, negative anterior sound data, positive anterior time stamp data and negative anterior time stamp data.

In an embodiment, generating amalgamated data comprises the processor:
  generating amalgamated positive sound data from the positive posterior sound data and the positive anterior sound data;
  generating amalgamated negative sound data from the negative posterior sound data and the negative anterior sound data;
  generating amalgamated positive time stamp data from the positive posterior time stamp data and the positive anterior time stamp data; and
  generating amalgamated negative time stamp data from the negative posterior time stamp data and the negative anterior time stamp data.

In an embodiment, comparing the posterior data and the amalgamated data, and the anterior data and the amalgamated data comprises the processor generating correlation coefficients between:
  amalgamated positive sound data and the positive posterior sound data;
  amalgamated positive sound data and the positive anterior sound data;
  amalgamated negative sound data and the negative posterior sound data; and
  amalgamated negative sound data and the negative anterior sound data.

In an embodiment, comparing the posterior data and the amalgamated data, and the anterior data and the amalgamated data comprises the processor generating correlation coefficients between:
  amalgamated positive time stamp data and the positive posterior time stamp data;
  amalgamated positive time stamp data and the positive anterior time stamp data;
  amalgamated negative time stamp data and the negative posterior time stamp data; and
  amalgamated negative time stamp data and the negative anterior time stamp data.

In an embodiment, the processor generates further correlation coefficients from the correlation coefficients representing:
  the amalgamated positive time stamp data and the positive posterior time stamp data, and the amalgamated positive time stamp data and the positive anterior time stamp data;
  the amalgamated negative time stamp data and the negative posterior time stamp data, and the amalgamated negative time stamp data and the negative anterior time stamp data;
  the amalgamated positive sound data and the positive posterior sound data, and the amalgamated positive sound data and the positive anterior sound data; and
  the amalgamated negative sound data and the negative posterior sound data, and the amalgamated negative sound data and the negative anterior sound data.

In an embodiment, the correlation coefficients are Pearson's coefficients.

In an embodiment, the processor is configured to apply decision logic based on the generated coefficients to determine whether there are correlations between the amalgamated data, the posterior data, and the anterior data that indicate that the posterior data matches the anterior data.

In an embodiment, the processing circuit comprises circuitry arranged to convert the captured signal into a square wave signal for processing by the processor.

In an embodiment, the circuitry comprises a Schmitt Trigger circuit.

In an embodiment, the sound recognition apparatus comprises a high-pass filter for high-pass filtering the captured signal and an amplifier for amplifying the high-pass filtered signal before the captured signal is converted into a square wave signal.

In an embodiment, the processor processes the square wave signal to:
  derive posterior sound data by storing a binary representation of transitions in the square wave signal; and
  derive posterior time stamp data by storing data indicative of the time between transitions.

In an embodiment, the processing circuit comprises circuitry arranged to convert the positive half-cycle of the posterior sound signal into a first square wave signal, and the negative half-cycle of the posterior sound signal into a second square wave signal.

In an embodiment, the circuitry comprises a first Schmitt Trigger circuit for converting the positive half-cycle and a second Schmitt Trigger circuit for converting the negative half-cycle.

In an embodiment, the sound recognition apparatus comprises a first high-pass filter for high-pass filtering the positive half-cycle of the captured signal and a first amplifier for amplifying the high-pass filtered positive half-cycle of the captured signal before the positive half-cycle of the captured signal is converted into the first square wave signal; and
  a second high-pass filter for high-pass filtering the negative half-cycle of the captured signal and a second amplifier for amplifying the high-pass filtered negative half-cycle of the captured signal before the negative half-cycle of the captured signal is converted into the second square wave signal.

In an embodiment, the processor:
Processes the first square wave signal to
  derive positive posterior sound data by storing a binary representation of transitions in the square wave signal to form, and
  derive positive posterior time stamp data by storing data indicative of the time between transitions; and
processes the second square wave signal to
  derive negative posterior sound data by storing a binary representation of transitions in the square wave signal to form, and
  derive negative posterior time stamp data by storing data indicative of the time between transitions.

BRIEF DESCRIPTION OF DRAWINGS

Embodiments of the invention will now be described with reference to the accompanying drawings in which.

DETAILED DESCRIPTION

Embodiments of the invention provide sound recognition apparatus which can advantageously be deployed in a resource-limited embedded systems but which can also be used in other application as described in further detail below.

In the embodiments of the invention, the sound recognition apparatus is used to detect voices, and hence is described as a voice recognition apparatus. However, persons skilled in the art will appreciate that the apparatus can be used to record and then subsequently recognise any sound.

Advantageous features of the invention include techniques for a speech feature extraction, voice data compression and statistical analysis of voice data.

Voice Recognition Apparatus

Figure 1:
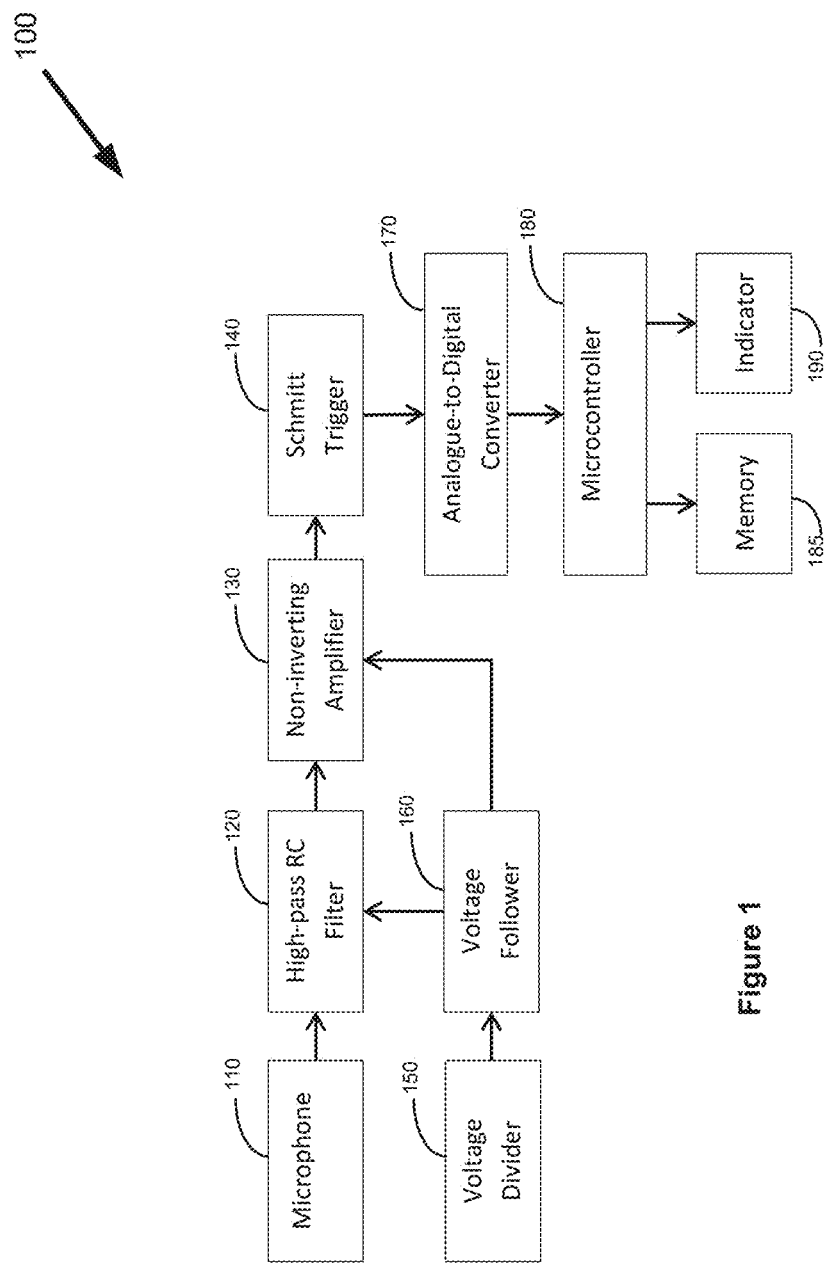
FIG. 1 is a block diagram of a voice recognition apparatus of an embodiment.

FIG. 1 is a block diagram of a voice recognition apparatus 100 of an embodiment. As shown in FIG. 1, the apparatus 100 has a microphone 110, voltage divider 150, voltage follower 160, filter 120, and an AC-coupled amplifier 130. The apparatus 100 also has a Schmitt Trigger 140 which may be replaced by a comparator or equivalent threshold detection circuitry in other embodiments. The apparatus 100 also has an analogue to digital converter (ADC) 170 (shown here as separate but may be incorporated within a microcontroller), a microcontroller 180 (or processor) with memory 185 (also shown here as separate but usually incorporated within the microcontroller), and one or more indicators 190 such as a speaker, a light or an output signal to some other component. Accordingly, it will be appreciated that the apparatus 100 provides a processing circuit for processing the sound signals captured by the microphone 110 that comprises a mixture of hardware components (e.g. the filter 120, amplifier 130 and Schmitt Trigger 140) and software components implemented by the microcontroller.

In an embodiment, all components of the voice recognition apparatus 100 circuitry are powered by supply voltage $V_{cc}$=+1.8 V and ground as reference, except for the high-pass RC filter 120 and the non-inverting amplifier 130 which use $$\frac{V_{CC}}{2}$$

as reference.

It will be appreciated that in other embodiments, a different supply voltage can be used, for example it is possible to use $V_{cc}$=+3.3 V but resistor values for Schmitt Trigger thresholds need to be adjusted accordingly. Similarly, if $V_{cc}$=+5.0 V is used, then some components will need to be replaced and/or have their values changed.

The microphone 110 used in the voice recognition apparatus 100 is an analogue microelectromechanical systems (MEMS) microphone. A digital MEMS microphone may also be used, but it would require more supporting components in the circuitry, but not the amplifier 130 and Schmitt Trigger 140.

The voltage divider 150 is a circuit that cuts the supply voltage by a proportion determined by a resistor network. In this embodiment, the voltage divider 150 serves to provide a DC bias voltage reference for the high-pass RC filter 120 and non-inverting amplifier 130. In the voice recognition apparatus 100, the voltage divider 150 uses two 10 kΩ resistors to divide +1.8 V to +0.9 V. The voltage divider 150 output is sent to the voltage follower 160, which acts as a buffer between the voltage divider and the rest of the circuit. The voltage follower 160 allows the filter's cut-off frequency and the non-inverting amplifier gain to be unaffected by the resistive loads of the voltage divider 150. The voltage follower 160 output is connected to the high-pass filter 120 and the non-inverting amplifier 130 at the point in the circuit where it would be used as a reference when comparing against incoming voice signals.

The MEMS microphone 110 is connected to a high-pass RC filter 120. Voice signals are alternating current (AC) small-signal waveforms which require a capacitor to pass through. The combination of the resistor and capacitor will determine the cut-off frequency $f_c$, which is given as $$f_c = \frac{1}{2\pi RC}$$

where R is the resistance in ohms, and C is the capacitance in Farads.

The cut-off frequency for a high-pass filter indicates that frequencies below $f_c$ will be attenuated, but not frequencies above $f_c$. The human voice range is from 80 to 260 Hz. In an example, the high pass filter 120 uses a 10 pF capacitor and 200Ω to obtain $f_c$=79.57 Hz. Although in other embodiments, a band-pass filter can be used in place of the high-pass filter, a high-pass filter can be advantageous in that the upper voice frequencies may give more data to the rest of the circuit when the user is at a greater distance from the microphone 110.

In this embodiment, the high-pass filter 120 is AC coupled to the non-inverting amplifier 130, which amplifies the output voice signals from the MEMS microphone. The non-inverting amplifier 130 has a voltage gain $A_v$ of, for example, 501. A large voltage gain value is used to allow sound from a distance to be detected. The voltage gain may be modified but it is advantageous if it is >=300. In embodiments of the invention, the output of the non-inverting amplifier 130 will fluctuate between +1.8 V and 0 V.

The non-inverting amplifier 130 output is sent to the inverting Schmitt Trigger 140. During the idle state of the voice recognition apparatus, the output from the amplifier 130 is logic low and the Schmitt Trigger 140 output is logic high. When a voice signal is detected, it is more effective for the Schmitt Trigger 140 to output a falling edge signal to indicate change, and have a pull-up resistor assist to bring the signal back to logic high. In some embodiments, a capacitor may be placed in parallel to the pull-up resistor to increase the rise-time of the signal, thereby slowing down the rising edge transition, as the signal is sent to the microcontroller 180.

Voltage thresholds are affected by distance. Voice as it travels a long distance will be weak when detected by the microphone. The high gain of the non-inverting amplifier is able to condition the signal. However, it will be apparent to the skilled person that the consequence of Schmitt Trigger thresholds that are too high or too low, or a large threshold difference ($V_H$–$V_L$), is less information. With less information, the microcontroller will have a harder time to discern the voice signal even if the same spoken word was said at the same recording location.

Pronunciation of syllables in a word has very small voltage swings of tens of millivolts peak-to-peak. When $$\frac{V_{CC}}{2}$$

is reference for the high-pass filter and non-inverting amplifier, the ideal values are $$V_L = \frac{V_{CC}}{2} + 0.02$$

and $V_H - V_L \approx 0.25$. When ground is reference for the high-pass filter and non-inverting amplifier, the ideal values are $V_L = V_M + 0.2$ and $V_H - V_L \approx 0.2$, where $V_M$ is the output voltage of the microphone when connected to the full circuit and the ambient sound is minimal. Regardless of the ideal values, the threshold values $V_L$ and $V_H$ should be adjusted to suit the environment or the desired application.

The Schmitt Trigger voltage reference $V_{ref}$ value can be adjusted to any value between 0 V and $V_{cc}$. In the apparatus 100, the voltage reference is connected to the supply voltage, $V_{ref} = V_{cc}$. The non-inverting amplifier 130 and the Schmitt Trigger 140 may also be powered by a differential voltage power supply. If so, the choice of voltage should match the desired supply voltage of the microcontroller. For example, if the microcontroller is powered with +3.3 V and ground, then the differential voltage to the non-inverting amplifier should be +3.3 V and −3.3 V with respect to ground. A clipper circuit can be used to normalise the voltage back to +3.3 V and 0 V so that the microcontroller can read the signal. If the signal is not symmetrical (when either the positive or the negative half-cycle is cut off, the period and duty cycle of the waveform is not the same), then a clipper circuit is not suitable. In some embodiments, clamper circuit followed by a level translator circuit may be used instead.

Figure 2:
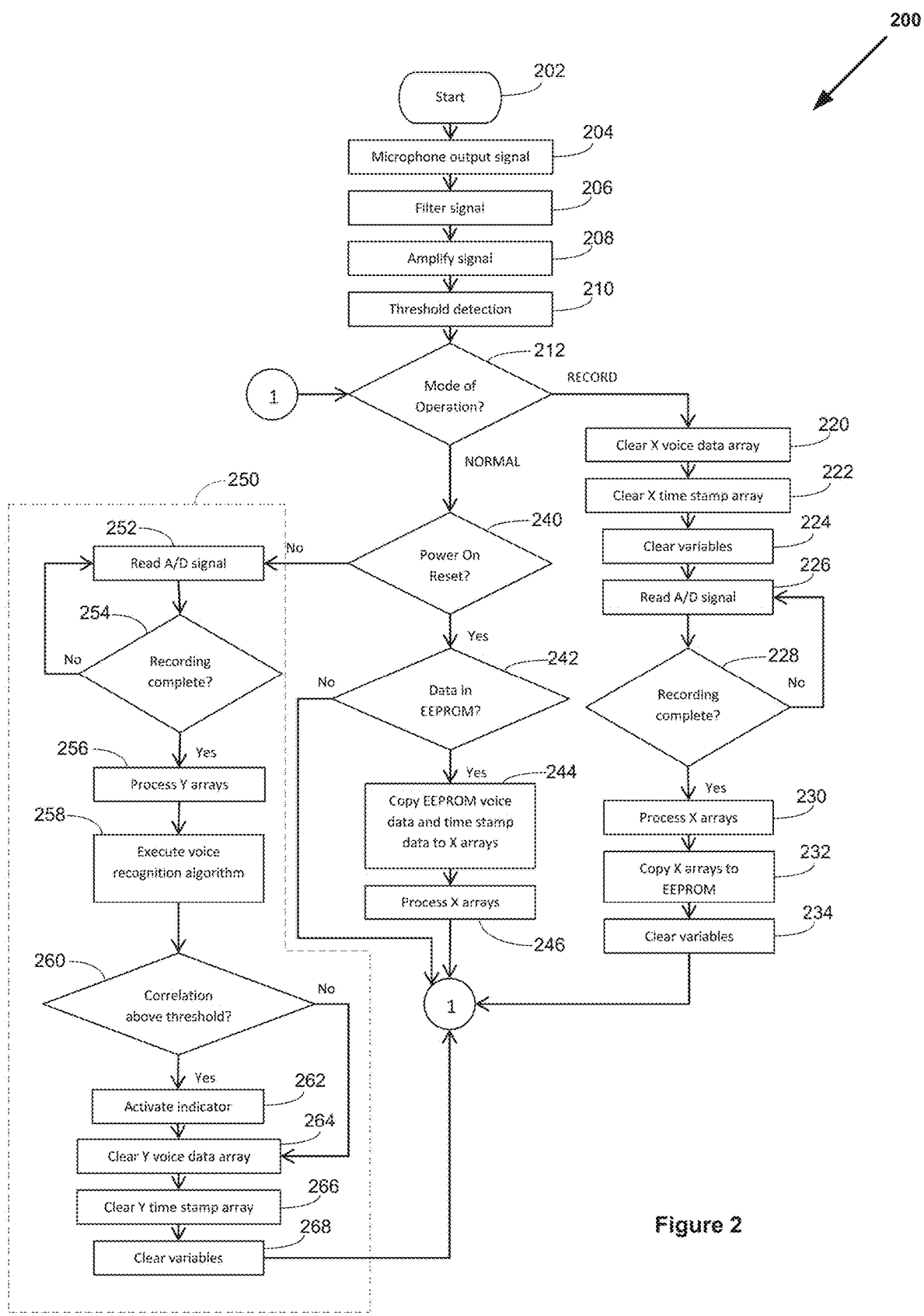
FIG. 2 is a flow chart of a method of an embodiment.

A method 200 of operating the apparatus 100 is shown in FIG. 2. The method 200 starts 202 when the microphone outputs 204 a signal. In step 206 the signal is filtered before being amplified in step 208. In step 210, threshold detection is used to determine whether the signal is to be processed further.

At step 212, the mode of operation of the apparatus 100 is determined. If the device is in a record mode, the microcontroller clears 220 the array storing any previously recorded voice data, termed the X voice data array, clears 222 the associated X time stamp array and clears 224 the stored variables. The microcontroller 180 then reads the signal output from the ADC 170 until it determines that recording is complete. The microcontroller 180 processes 230 the recorded signal to generate anterior voice data in accordance with one of the techniques described below and copies 232 the generated anterior voice data to memory 185 (an EEPROM) before clearing variables 234. The method then returns (as indicated by link 1-1) to determining 212 the mode of operation.

The generated anterior voice data is stored in an EEPROM so that it remains in memory 185 should the apparatus 100 be powered off. When the apparatus 100 enters a normal mode of operation, it determines 240 whether it has been subjected to a power on reset. If it has, at step 242 it determines whether there is data in the EEPROM 185 and copies the anterior voice and time stamp data to the X voice data array and associated X time stamp array. The microcontroller 180 also processes 240 the X arrays as described below.

If there is no power on reset, the microcontroller 180 generates posterior voice data by reading the signal output from the ADC 170 until it determines that recording is complete. The microcontroller 180 processes 256 the recorded signal to generate posterior voice and time stamp data to store in Y arrays in accordance with the same technique used to generate the anterior voice and time stamp data. The microcontroller then executes one of the relevant voice recognition algorithms described below to compare the posterior voice and time stamp data to the anterior voice and time stamp data. At step 260, it is determined whether the correlation from the comparison is above a set threshold and, if so, at step 262 an indicator is activated.

The method then involves steps of clearing 264 the Y array for voice data, clearing the 266 the Y array for time data and clearing 268 the variables derived from the posterior data in preparation for receiving a further posterior utterance.

In the flowchart of FIG. 2, the voice recognition function processes the voice data and time stamp data once every cycle through the main loop 250 of the firmware. In an embodiment, the statistical analysis is simplified into small tasks that will take several rounds in the main loop to complete. For the apparatus, the main loop timing (or sampling period) is set to 500 microseconds with a 1 millisecond period. A faster main loop timing is acceptable in other embodiments. The main loop timing is advantageously faster than 260 Hz and fulfil the Nyquist-Shannon sampling criterion. The Nyquist-Shannon sampling criterion states that the sampling frequency should be greater than double the highest desired frequency B (or bandwidth). Therefore, $f_s > 2B$, where $f_s$ is the Nyquist-Shannon sampling frequency (Hz), and B is the highest desired frequency (Hz).

To implement the statistical analysis, the firmware/software can be structured as a batch process, a soft real-time process, or any other appropriate process.

Speech Features Extraction

As described above, in the voice recognition apparatus 100, the voice signal is recorded using a MEMS microphone 110. When voice is detected by the microphone 110, the voice signal has variable amplitude and frequency, which changes rapidly as different words are spoken at different speeds. The voice signal has both positive and negative half-cycles, which means the signal will vary its amplitude between a positive voltage amplitude and a negative voltage amplitude. The Schmitt Trigger 140 (or comparator or logic circuit or any threshold detection circuit) will convert the positive and negative half-cycles into digital square waveform. The speech features extraction process is implemented in hardware to reduce the computational workload. The frequency and phase of the voice signal is unaffected.

A number of different embodiments can be used to extract speech features. For example:

1) In one embodiment, the apparatus uses only the positive half-cycles. If the voice signal crosses the voltage threshold, one bit of data is collected. This produces a single data stream.

2) In another embodiment, the apparatus uses both positive and negative half-cycles from the voice signal. There will be two streams of data to be processed.

3) In another embodiment, the apparatus feeds the voice signal to an analogue-to-digital converter without going through a threshold detection circuit.

Single Data Stream

In a single data stream configuration, an apparatus 100 as shown in FIG. 1 is employed.

In an embodiment, both the non-inverting amplifier and Schmitt Trigger are built using operational amplifiers with large bandwidth, high slew rate, and rail-to-rail output. The non-inverting amplifier has a voltage gain of 501, and a reference voltage set to $$\frac{V_{CC}}{2}$$

for its resistor network.

In one example, the Schmitt Trigger 140 is configured with a low voltage threshold $V_L$ of 0.9209 V and a high voltage threshold $V_H$ of 1.172 V. The Schmitt Trigger 140 has three resistors: two resistors form a voltage divider with the output connected to the non-inverting terminal of the Schmitt Trigger 140; and, the third resistor is connected from the output of the Schmitt Trigger to the non-inverting terminal of the operational amplifier, in order to provide open loop feedback which improves the Schmitt Trigger's switching performance. The choice of resistor values in the Schmitt Trigger 140 is advantageously selected to produce a duty cycle of approximately 40% to 50% when a 1 kHz sine wave sound is detected continuously for a few seconds at a distance of 0.5 m from the microphone. An appropriate value for the duty cycle enables the signal to remain stable long enough for the ADC 170 to read the signal. In other embodiments, the Schmitt Trigger 140 may also be configured as non-inverting, since the difference in operation is handled in the firmware. As indicated above, the Schmitt Trigger may also be replaced by a comparator. However, there would only be one threshold, so fast signals may not be read correctly by the microcontroller.

Figure 3:
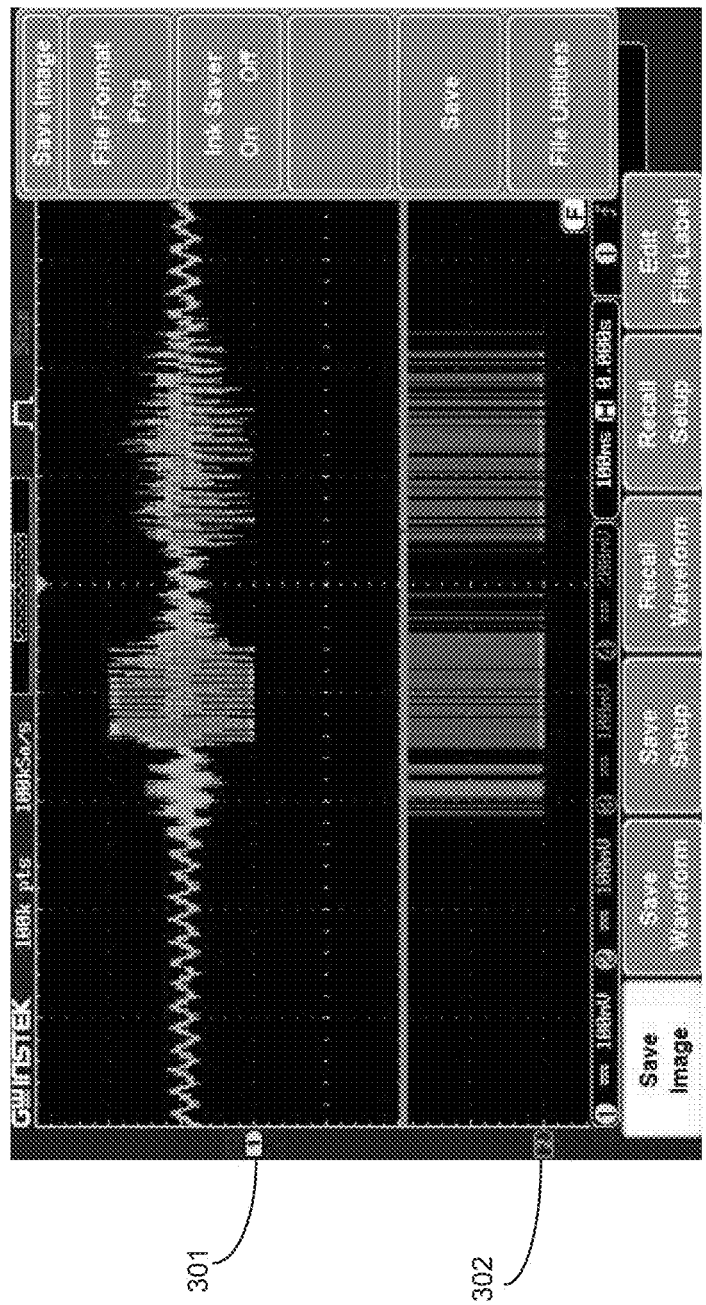
FIG. 3 is a shows signals corresponding to the amplified voice signal and the output of the Schmitt Trigger.

FIG. 3 is an illustration of signals in the apparatus. Waveform 301 represents the voice signal after it has been amplified. The waveform's amplitude will vary from the DC bias voltage. Peak amplitude values greater than the 0 V to 1.8 V range will be clipped. Waveform 302 represents the output from the Schmitt Trigger.

Figure 4:
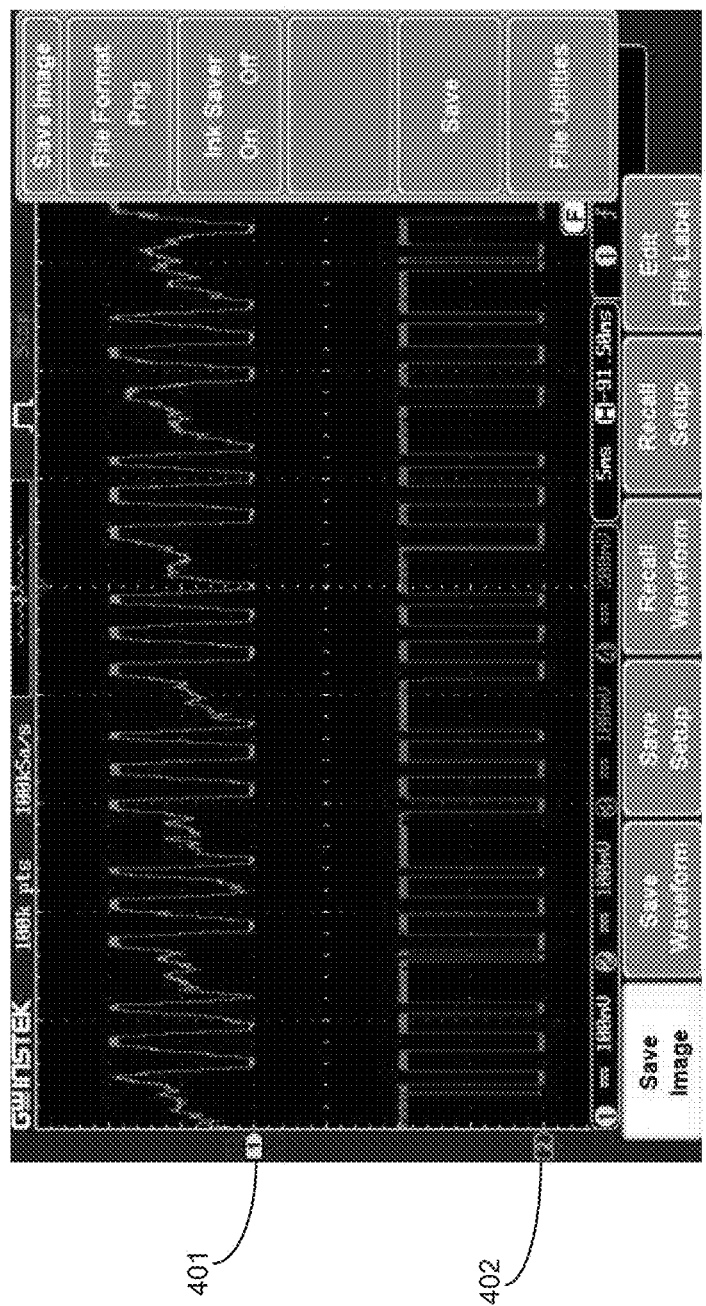
FIG. 4 is a view of a part of the signals of FIG. 3.
Figure 5:
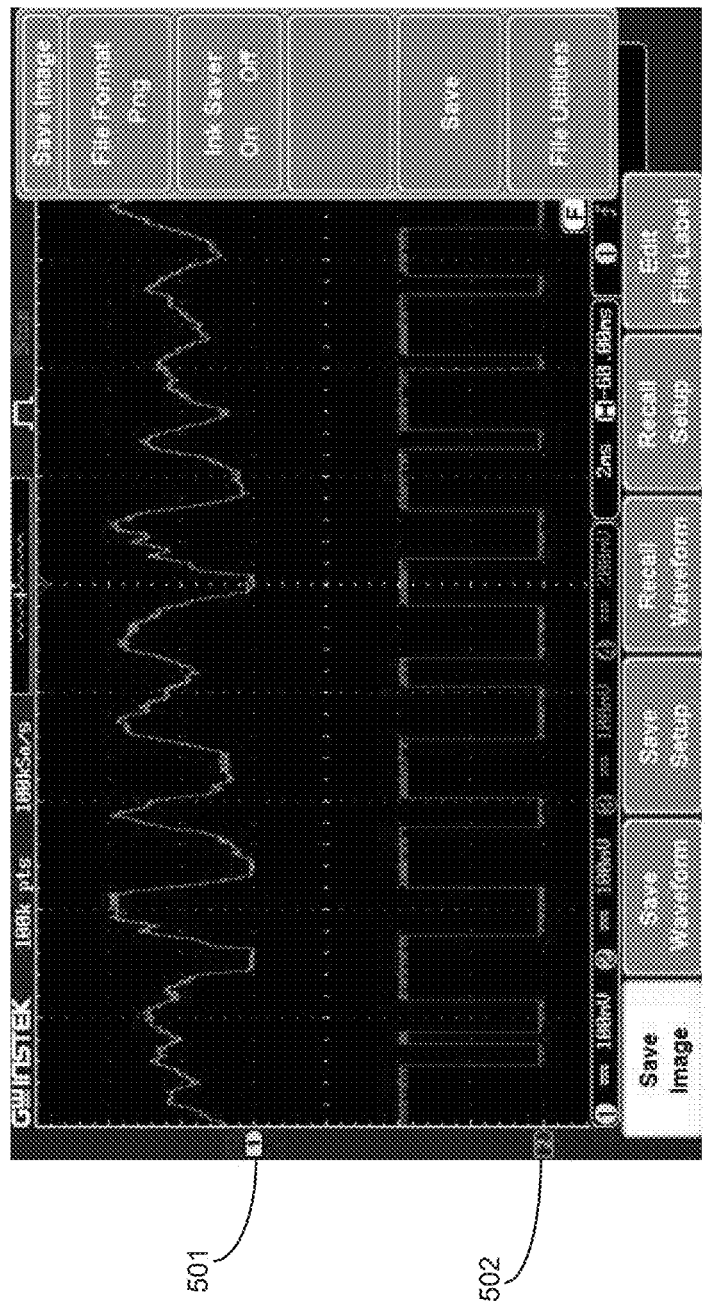
FIG. 5 shows another amplified voice signal and the output of the Schmitt Trigger.

In FIG. 4, a small portion 401 of the previous voice signal 301 (from FIG. 3) is in focus. The voice signal exhibits a periodic pattern with high frequency, but only for a few milliseconds. A positive half-cycle from the voice signal is inverted at the output 402 of the Schmitt Trigger. A negative half-cycle causes the output to return to high. In FIG. 5, the voice signal 501 has an irregular pattern with low frequencies, which will produce an output 502 with a bigger duty cycle.

Single Data Stream (with Ground as Reference)

The single data stream configuration can also use ground as a reference for the high-pass RC filter 120 and the non-inverting amplifier 130. All other functions in the circuit 100 remain the same. As above, the filter 120 output is connected to the non-inverting amplifier 130 with a voltage gain of 501. The amplified output is connected to an inverting Schmitt Trigger with a low voltage threshold $V_L$ of 0.2416 V and a high voltage threshold $V_H$ of 0.5415 V. Again, the resistor values for the Schmitt Trigger are chosen to produce a duty cycle of approximately 40% to 50% when a 1 kHz sine wave sound is detected continuously for a few seconds at 0.5 m from the microphone.

In this embodiment, when no sound is detected by the microphone, the idle voltage at the output of the non-inverting amplifier is close to zero. The Schmitt Trigger's low voltage threshold is configured to be slightly above the idle voltage. The idle voltage may be influenced by the choice of voltage gain of the non-inverting amplifier. As above, the Schmitt Trigger 140 may also be configured as non-inverting, or replaced by a comparator.

Figure 6:
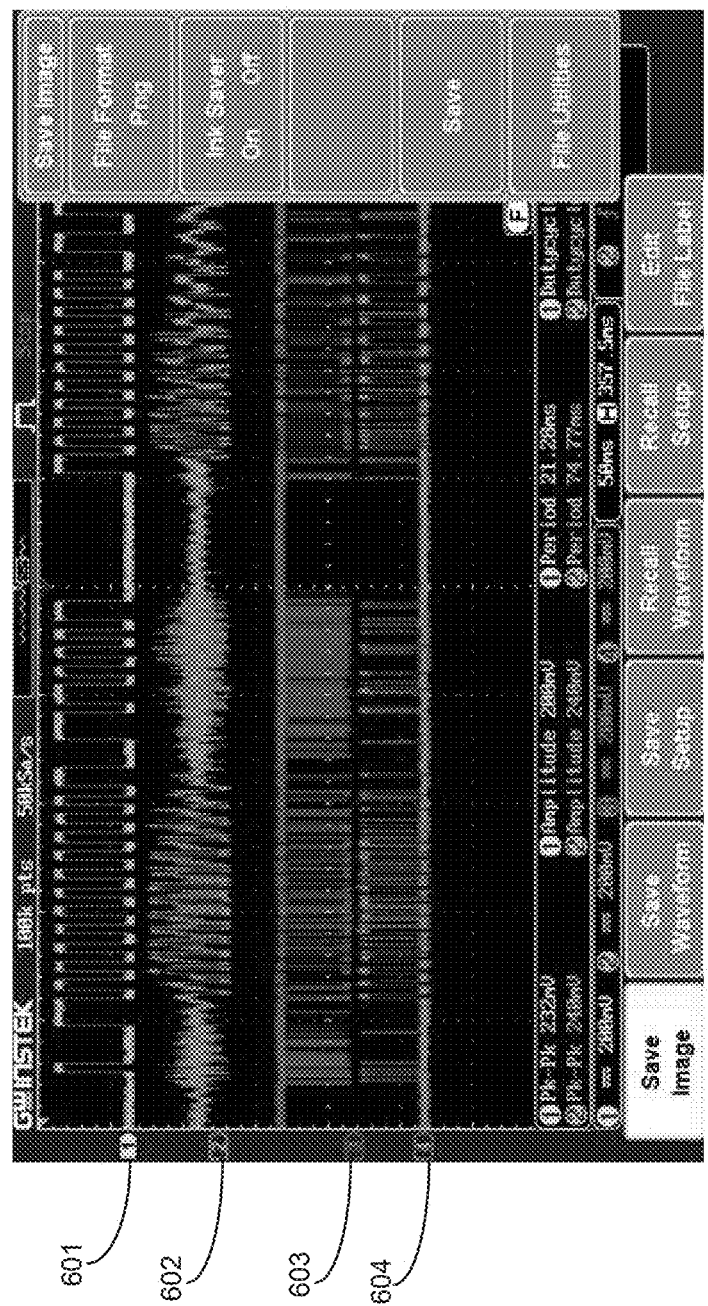
FIG. 6 illustrates a spoken word being processed in accordance with a single data stream, ground as reference configuration.

FIG. 6 shows a spoken word being processed in accordance with this embodiment. Waveform 601 represents a toggled pulse that indicates when data is being collected by the microcontroller 180. Waveform 602 is the voice signal output from the non-inverting amplifier 130. Waveform 603 is the output from the Schmitt Trigger 140. Waveform 604 is the data collected and regenerated as digital output signal from microcontroller 180. This is done to show that the data coming into the microcontroller has been read and stored correctly. But waveforms 603 and 604 do not match completely in FIG. 6, because the microcontroller may have decided certain input signals from waveform 603 is not valid.

Dual Data Stream (with Ground Reference)

The apparatus 100 can be adapted to operate in dual data stream configuration. In a dual data stream configuration, the voice signal from the microphone 110 is split into two channels, one for positive half-cycles and another for negative half-cycles. This arrangement produces superior square wave pulses to the single stream arrangement. Each channel has an amplifier set to a voltage gain of 501 and a Schmitt Trigger. The resistor networks and the voltage references for both the positive Schmitt Trigger and the negative Schmitt Trigger are configured to have an active high signal and idle low signal. The power supply provides a differential output voltage of +1.8 V and −1.8 V (with ground as reference) for the non-inverting amplifiers and Schmitt Triggers. The signalling may be reversed by adjusting the voltage reference polarities.

In this embodiment, an inverting amplifier is connected to the inverting Schmitt Trigger for the positive half-cycles has −1.8 V with respect to ground as reference voltage in its resistor network; the positive voltage thresholds are $V_{H+}$=+0.5415 V and $V_{L+}$=+0.2416 V.

A non-inverting amplifier is connected to the inverting Schmitt Trigger for the negative half-cycles has −1.8 V with respect to ground as reference voltage in its resistor network; the negative thresholds are $V_{H-}$=−0.5415 and $V_{L-}$=−0.2416 V.

An alternative method is to replace the Schmitt Triggers with comparators. The comparator is built from an operational amplifier. It would only have one threshold instead of the Schmitt Trigger's two thresholds. In this arrangement, each channel will still have a non-inverting amplifier, followed by either the positive or negative comparator. The positive comparator input is the non-inverting terminal. The threshold of the positive comparator is set by a voltage divider circuit, with its output connected to the inverting terminal. The negative comparator reads the input at the inverting terminal. The threshold of the negative comparator is set by another voltage divider circuit, with the output connected to the non-inverting terminal. Before the data generated can be sent to the microcontroller, it is clipped to fit the +1.8 V and ground voltage system of the microcontroller. A clipper circuit consisting of a resistor and a fast-switching small signal diode is placed at the output of each comparator. All data from the comparators are active high signals.

Another alternative method is to use a logic circuit to determine whether the input voice signal has crossed the threshold. The logic circuit can be built using diodes or discrete IC components in combination with a voltage divider circuit. The threshold voltage is the output voltage of the voltage divider circuit. For circuits with differential voltage supply, then a clipper circuit or a level translation circuit is used to convert the voltages to a safe level for the microcontroller.

Figure 7:
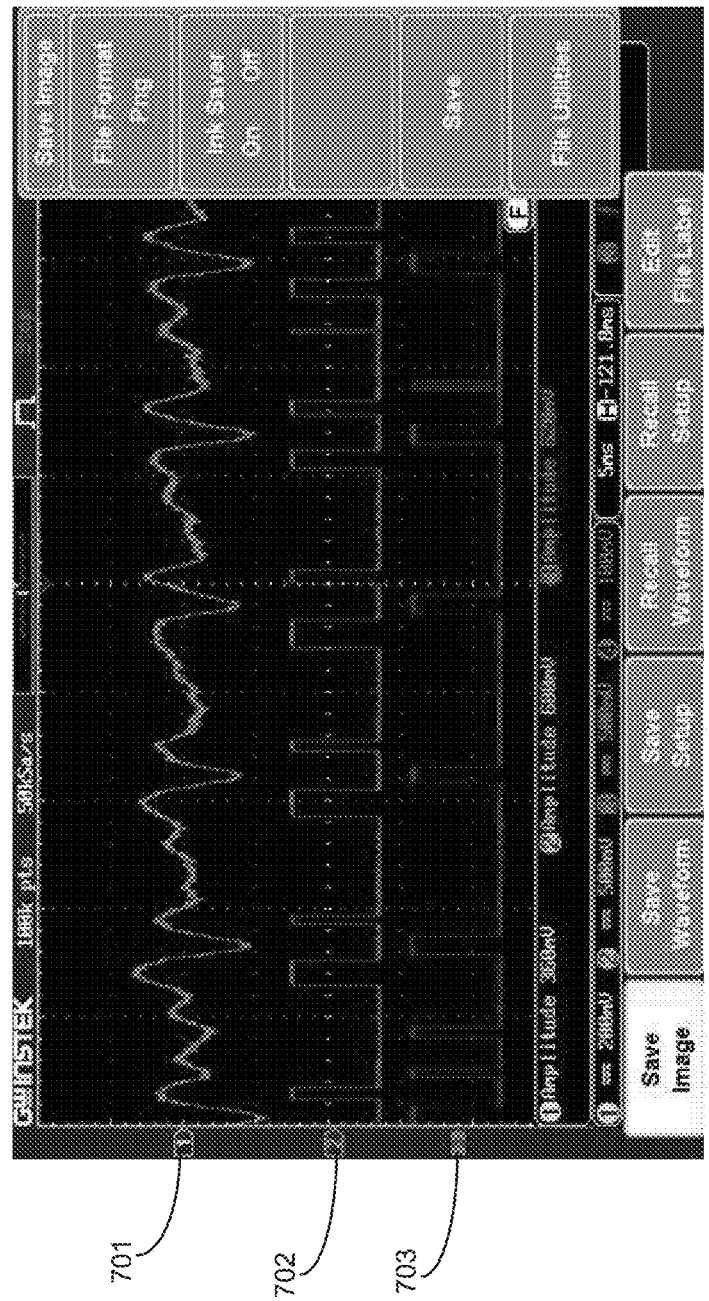
FIG. 7 illustrates an example of how a dual data stream voice recognition apparatus processes the input voice signal to produce the output waveforms.

FIG. 7 illustrates an example of how a dual data stream voice recognition apparatus processes the input voice signal to produce the output waveforms. Waveform 701 is the input voice signal. Waveform 702 is the square wave output of the positive half-cycles in the voice signal. Waveform 703 is the square wave output of the negative half-cycles in the voice signal. Both outputs 702 and 703 will fluctuate between +1.8 V and −1.8 V. In waveform 702, every time the voice signal amplitude exceeds the positive voltage thresholds ($V_{H+}$ and $V_{L+}$) it will produce +1.8 V high signal. Once the voice signal falls below both positive thresholds, the output 702 returns to its −1.8 V low signal. The reverse is true for waveform 703, which monitors the negative half-cycles of the voice signal.

Raw Data Stream

In other embodiments, the voice recognition apparatus can be adapted into one of two exemplary versions of a raw data stream configuration:

In an embodiment, the power supply to the microphone, microcontroller, and non-inverting amplifier is +1.8 V and referenced to ground. The voice signal is amplified by a non-inverting amplifier (with a voltage gain of approximately 300) and sent directly to an analogue channel in the internal ADC in the microcontroller. Thus, this configuration is essentially the same as the single data stream configuration, but without the Schmitt Trigger (or comparator or any threshold detection circuit). Depending on the embodiment, a DC voltage bias may or may not be used.

In another embodiment, the power supply to the non-inverting amplifier and ADC is +1.8 V and −1.8 V with ground as reference. The microphone and microcontroller are powered by +1.8 V and ground as reference. The voice signal is amplified by the non-inverting amplifier (with a voltage gain of approximately 300) and sent to an external high-speed, high-precision ADC before the microcontroller. A fast ADC is needed to process the voice signals with better precision, but also requires an external clock to synchronise with the microcontroller. If a suitable microcontroller has an internal high-speed ADC, that is perfectly acceptable. The Schmitt Trigger (or comparator or any threshold detection circuit is not used). Using a slower ADC is not preferred as it will miss details in the voice signal. A DC voltage bias may or may not be used.

Further Configurations

While a number of advantageous configurations have been described, persons skilled in the art will appreciate that alternative means for speech features extraction can employ the combined or mixed use of the single data stream, dual data stream, and raw data stream configurations.

For example, application of the single data stream, dual data stream, and raw data stream configurations can involve having multiple instances of the filter, amplifier and threshold detection circuitry, each with different cut-off frequency, voltage gain and threshold values with each configuration set up as individual channels for the same microphone or several microphones. Any combination of the three configurations may be used. As the input voice signal is received and amplified, each channel will produce square waves of differing duty cycles and periods because of their different thresholds. The varied output values of the threshold detection circuits will give a more unique signature for the voice signal. However, there will be more data processing work for the microcontroller or processors.

Voice Data Compression

In a typical application, the user captures an utterance (e.g. a word) into the device in a set-up mode and the device compares subsequent utterances to the data representing the captured utterance.

In an embodiment, the voice signal is collected as data by the microcontroller 180 one bit at a time. When 8 bits (1 Byte) are collected, it is stored as one sample in the memory 185. At the same time, the time taken to collect the current sample from the previous sample is also recorded. The purpose is to reference the voice data to a time stamp. As the data is collected by reading periodically from the voice signal, the collected data would be indirectly compressed with respect to time. Because the peak values past a certain threshold in the voice signal are neglected, there is sufficient uniqueness in the data for a particular speech or spoken word. Data compression when applied to long and continuous signals will require segmentation of data; the data is analysed segment by segment as the signal is received. Accordingly, it will be appreciated that in the embodiments, the data captured comprises both voice data and time stamp data. Other embodiments may, for example, only employ voice data.

The output signal from the Schmitt Trigger 140 is normally high at +1.8 V. An active low signal (logic low signal or 0 V) indicates there has been a change in the voice signal. As the user speaks, the signal will fluctuate between +1.8 V to 0 V and back to +1.8 V, many times over. As shown above, the fluctuations resemble square waveform, but are still analogue because as the user's voice gets softer the amplitude of the signal will be reduced as well. Depending on the embodiment, the Schmitt Trigger 140 output can be sent to either an internal ADC 170 in the microcontroller 180 or an external ADC. Thus, in an embodiment, the Schmitt Trigger 140 output is connected to the internal ADC 170 via an analogue pin of the microcontroller. The analogue pin is an ADC data channel in the internal ADC module of the microcontroller 180.

The output of the Schmitt Trigger 140 is inverted in the firmware. If the Schmitt Trigger 140 output is a logic low signal, then the firmware will interpret it as a 1. If it is a logic high signal, it is read as a 0. The voice data is stored in a voice data array in the memory. At the start of every new recording session, there is a counter variable in the firmware that increments every time the analogue signal is read. When the voice data is stored, the current value in the counter variable is stored in the time stamp data array. The counter variable is then reset and continues to increment as usual in the next round of the analogue signal read operation. The time stamp data thus represents the amount of time that has elapsed from the last sample recording to the current sample. Both arrays are configured to have the same size, for example, 80 Bytes or 120 Bytes. Larger arrays can be used in other embodiments, particularly those where data is stored outside the EEPROM.

The voice recording session is a two-step process. The first step involves collecting one bit of data from the analogue pin and assembling a byte of data. During assembly, if eight bits have not been collected in its entirety, the firmware will check for the need to stop recording or not. This is to prevent spurious sounds in the environment or ambient noise from being processed as real voice or the current recording being ignored because the user has decided to stop speaking after a while.

The second step happens once eight bits of data are collected. In other embodiments, the grouping of bits may be extended to 16 bits or 32 bits or more if this can be accommodated in the microcontroller memory or in an external memory device (if one is used). The firmware checks if the data has a numerical value of greater than zero. Data with a value of zero is discarded because it is a waste of memory space. It is considered a waste because it will also trigger the firmware to keep storing zero data from the ADC even when there is no sound, and process the data without any consideration of its usefulness. The firmware periodically reads from the analogue pin. So when one bit of data is collected and stored, the next round may or may not have data to collect. The voice recording session continues until the firmware detects a brief moment of silence, set at 0.25 seconds, which indicates the end of the current recording and to proceed to analysis. If the firmware detects 120 seconds of silence since the beginning of the recording session, then it will end the recording and do nothing. Persons skilled in the art will appreciate that the timing to end the recording is customisable. While a spoken word or a single utterance typically will not have any pauses of silence, speech contains brief pauses of silence in between spoken words. When speech is recorded, the firmware will store the data of an utterance during the brief period of silence while simultaneously waiting for the next utterance to begin. Only when there is an extended period of silence will the recording session end.

If a single stream of data configuration is used (positive half-cycles only) then, in one example, the microcontroller 180 can stored up to 120 Bytes of data for voice signals and 120 Bytes of data for time stamps. If dual streams of data are used (positive and negative half-cycles) then the microcontroller 180 can be configured to store up to 80 Bytes of data for positive half-cycles of the voice signals, 80 Bytes of data for negative half-cycles of the voice signals, and 80 Bytes of data for time stamps.

The 240 Bytes memory space usage is functional selection, in order to use the 256 Byte EEPROM of the microcontroller selected for implementation as permanent storage for the captured utterance (or "anterior voice data"). It provides the convenience of retrieving the data again in the event of a power failure (e.g. change of batteries) so the user does not have to record another utterance. The additional 16 Bytes of EEPROM memory space is used for storing housekeeping variables.

If the raw data stream is used, the firmware cannot store the voice signals and time stamps in an EEPROM of this size because there is too much data. The amount of memory for storing voice signals and time stamps are limited only by the microcontroller or computing device. However, if the battery fails then the utterance needs to be re-recorded. An external memory device can be used to store more data in other applications where a longer recording is required.

In an alternative embodiment, when the data is collected and stored, the number of zero data that occurs between samples is counted and stored in a separate array. In addition to the voice data array and time stamp data array, the zero data array will provide more data for statistical analysis and also makes the data encoding the voice signal more distinctive. In such embodiments, the size of the zero data array will match the other arrays. In such embodiments, the firmware cannot monitor the analogue pin continuously as before, and is modified to start the recording session only when there is evidence of voice signal being present. In one example, the voice signal must exceed a higher threshold value in the threshold detection circuitry. After that, the conditions to stop the recording session remain the same. In another example, the apparatus has another input device (e.g. a button) to trigger recording. In other examples, the trigger for recording a voice signal can be a sensor, transducer or external circuit.

For long and continuous signals that cannot fit in the voice data array of the microcontroller, the data is segmented into groups to be analysed one segment at a time. The voice data array is considered as a segment, and when the statistical analysis is completed, the array is filled again with data and the analysis continues until the whole signal is processed. All other data arrays are processed in a similar fashion.

Statistical Analysis of Voice Data

The initially recorded voice data which is stored within the voice recognition apparatus for subsequent comparison is referred to as the "anterior utterance". Any voice data recorded afterwards is a "posterior utterance", which be compared to the anterior utterance during statistical analysis. The time stamp data from the anterior and posterior utterances will also be compared. Before the comparison is done, the data from anterior and posterior utterances are combined to create amalgamated utterance data. The same will apply to the time stamp data: i.e. amalgamated time stamp data is formed from the anterior and posterior utterance time stamp data. The amalgamated data serves as a reference to both the anterior and posterior utterances during analysis.

For statistical analysis, the following basic variables are calculated: average value, deviation, the root of sum of squares of the deviation (RSSD), and the sum of cross-product deviation (SCPD or covariation). To compare the anterior and posterior data, Pearson's correlation coefficient is used as a signal matching function. A correlation coefficient indicates how well one signal matches the other. Four correlation coefficients are created: (1) correlation between anterior voice data and amalgamated voice data; (2) correlation between posterior voice data and amalgamated voice data; (3) correlation between anterior time stamp data and amalgamated time stamp data; (4) correlation between posterior time stamp data and amalgamated time stamp data.

When the values of the correlation coefficients for voice data are positive, there is a high probability that the signals match. Consequently, there is no match if the correlation coefficients have negative values or zero. The correlation coefficients for time stamp data add to the signal matching precision.

The amalgamated signal is used as reference to reduce the risk of two different words with the same number of syllables triggering a high correlation result (false positive) when it should not. Further, a direct comparison between anterior and posterior data using the Pearson's correlation coefficient will likely fail to detect the difference in words, due to the method of voice data compression used by the apparatus.

The same word can be spoken differently by the same user each time because of the distance from the microphone, state of mind, or circumstance. The same word recorded by the microphone at any distance will have similar characteristics when the analogue signal is viewed by sight on an oscilloscope. But the scale of the analogue signal detected far from the microphone is smaller than the signal detected close to the microphone for the same spoken word. So, the effect is a low correlation result. The effect is identical when a spoken word is recorded and encoded far from the apparatus, but the user utters the word near the apparatus expecting a positive correlation result.

Ideally, the user must be a similar distance from the voice recognition apparatus to where the spoken word was recorded and encoded to obtain a positive correlation result.

Where the position of the voice recognition apparatus is fixed, this requires the user to be near the original location as shown in Table 1.

| Data Comparison | Result | | |
|---|---|---|---|
| | Positive correlation | Zero correlation | Negative correlation |
| Anterior = Posterior | User is near original location | — | — |
| Anterior ≈ Posterior | User is far from original location | — | — |

Single Data Stream

As indicated above, there are two sets of data stored in the microcontroller: anterior voice data and posterior voice data. The anterior voice data is the spoken word encoded and stored in the memory. The posterior voice data is the current recording of a spoken word that has to be verified.

The following processing method is for a single data stream configuration (either $$\frac{V_{CC}}{2}$$

reference or ground reference)
1. Convert voice signal from the Schmitt Trigger 140 to anterior voice data:
   a. Collect and store the anterior voice data in an array in the memory 185;
   b. Collect and store the anterior time stamp data in its own array;
   c. Calculate the average value of the anterior voice data, and store the result in a variable in the memory;
   d. Calculate the average value of the anterior time stamp data, and store the result in a variable in the memory;
   e. Calculate the deviation of the anterior voice data, store the results in an array in the memory;
   f. Calculate the deviation of the anterior time stamp data, store the results in an array in the memory;
   g. Calculate the RSSD of the anterior voice data, and store the result in a variable in the memory;
   h. Calculate the RSSD of the anterior time stamp data, and store the result in a variable in the memory.
2. Wait for next utterance, then convert voice signal from the Schmitt Trigger to posterior voice data:
   a. Collect and store the posterior voice data in an array in the memory;
   b. Collect and store the posterior time stamp data in its own array.
3. Calculate the amalgamated voice data using anterior and posterior voice data.
4. Calculate the amalgamated time stamp data using time stamps of the anterior and posterior voice data.
5. Calculate the average value of:
   a. the posterior voice data;
   b. the posterior time stamp data;
   c. the amalgamated voice data;
   d. the amalgamated time stamp data.
6. Calculate the deviation of:
   a. the posterior voice data;
   b. the posterior time stamp data;
   c. the amalgamated voice data;
   d. the amalgamated time stamp data.
7. Calculate the RSSD of:
   a. the posterior voice data;
   b. the posterior time stamp data;
   c. the amalgamated voice data;
   d. the amalgamated time stamp data.
8. Calculate the covariation:
   a. between the anterior data and amalgamated voice data;
   b. between the posterior data and amalgamated voice data;
   c. between the anterior time stamp data and amalgamated time stamp data;
   d. between the posterior time stamp data and amalgamated time stamp data.
9. Calculate the Pearson's correlation coefficient for the:
   a. correlation between anterior voice data and amalgamated voice data;
   b. correlation between posterior voice data and amalgamated voice data;
   c. correlation between anterior time stamp data and amalgamated time stamp data;
   d. correlation between posterior time stamp data and amalgamated time stamp data.
10. Apply decision logic to the four Pearson's correlation coefficients.

The following variables are used:
n is the total number of samples
$x_i$ is the current $i^{th}$ sample of the anterior voice data
$\bar{x}$ is the average value of the anterior voice data
$p_i$ is the current $i^{th}$ sample of the anterior time stamp data
$\bar{p}$ is the average value of the anterior time stamp data
$y_i$ is the current $i^{th}$ sample of the posterior voice data
$\bar{y}$ is the average value of the posterior voice data
$q_i$ is the current $i^{th}$ sample of the posterior time stamp data
$\bar{q}$ is the average value of the posterior time stamp data
$d_i$ is the amalgamated voice data for the current $i^{th}$ sample
$t_i$ is the amalgamated time stamp data for the current $i^{th}$ sample
$RSSD_x$ is the RSSD of the anterior voice data
$RSSD_p$ is the RSSD of the anterior time stamp data
$RSSD_y$ is the RSSD of the posterior voice data
$RSSD_q$ is the RSSD of the posterior time stamp data
$RSSD_d$ is the RSSD of the amalgamated voice data
$RSSD_t$ is the RSSD of the amalgamated time stamp data
$SCPD_{xd}$ is the covariation of anterior voice data and amalgamated voice data
$SCPD_{yd}$ is the covariation of posterior voice data and amalgamated voice data
$SCPD_{pt}$ is the covariation of anterior time stamp data and amalgamated time stamp data
$SCPD_{qt}$ is the covariation of posterior time stamp data and amalgamated time stamp data
$r_{xd}$ is the Pearson's correlation coefficient for anterior voice data and amalgamated voice data
$r_{yd}$ is the Pearson's correlation coefficient for posterior voice data and amalgamated voice data
$r_{pt}$ is the Pearson's correlation coefficient for anterior time stamp data and amalgamated time stamp data
$r_{qt}$ is the Pearson's correlation coefficient for posterior time stamp data and amalgamated time stamp data Step 1:

The voice signal processed by the Schmitt Trigger 140 becomes a square wave with varying frequencies. The amplitude of the square wave is proportional to the strength of the voice signal. The square wave is an active low signal. When there is no voice detected, the output of the Schmitt Trigger 140 is normally logic high. Otherwise, a logic low which indicates that the voice signal has crossed the Schmitt Trigger thresholds. Thus, when the square wave is high signal, the firmware of the microcontroller 180 will read it as a 0. When the square wave is a low signal, the firmware reads a 1. The anterior voice data x is stored in an array in the memory 185. The anterior time stamp data p is collected and stored in an array of its own. Next, the average value, deviation, and the root of sum of squares of the deviation (RSSD) of the anterior voice data and anterior time stamp data are calculated. The firmware will calculate these variables in parts, in order to improve efficiency.

The average value of the anterior voice data $\bar{x}$ is:

$$\bar{x} = \frac{1}{n}\sum_{i=1}^{n} x_i$$

The average value of the anterior time stamp data $\bar{p}$ is:

$$\bar{p} = \frac{1}{n}\sum_{i=1}^{n} p_i$$

Calculate the deviations for the voice data and time stamp data for every sample in the array. Each of the deviation results are stored in its own array.

The deviation of the anterior voice data:

$$x_i - \bar{x}$$

The deviation of the anterior time stamp data:

$$p_i - \bar{p}$$

The RSSD of the anterior voice data is:

$$RSSD_x = \sqrt{\Sigma_{i=1}^{n}(x_i-\bar{x})^2}$$

The RSSD of the anterior time stamp data is:

$$RSSD_p = \sqrt{\Sigma_{i=1}^{n}(p_i-\bar{p})^2}$$

These values are all stored for later processing of an anterior utterance to compare it to a posterior utterance.

Step 2:

At a later time, a posterior utterance is captured for comparison purposes. The conversion of the posterior utterance into posterior voice data from the Schmitt Trigger 140 output is the same as in the first step. The posterior voice data y is stored in another array in the memory. The posterior time stamp data q is collected and stored its own array as well.

Step 3:

The amalgamated voice data is produced from the square root product of each sample in the anterior and posterior data arrays. The result is stored in its own array. The number of samples produced in the amalgamated voice data array from the equation below will match the number of samples in the voice data arrays.

The current $i^{th}$ sample of the amalgamated voice data $d_i$ is:

$$d_i = \sqrt{x_i \cdot y_i}$$

Step 4:

The amalgamated time stamp data is produced from the square root product of the current sample in the anterior and posterior time stamp data arrays. The result is stored its own array. The number of samples produced in the amalgamated time stamp data array from the equation below will match the number of samples in the anterior and posterior time stamp data arrays.

The current $i^{th}$ sample of the amalgamated time stamp data $t_i$ is:

$$t_i = \sqrt{p_i \cdot q_i}$$

Step 5:

The average value of the posterior voice data $\bar{y}$ is:

$$\bar{y} = \frac{1}{n}\sum_{i=1}^{n} y_i$$

The average value of the posterior time stamp data $\bar{q}$ is:

$$\bar{q} = \frac{1}{n}\sum_{i=1}^{n} q_i$$

The average value of the amalgamated voice data $\bar{d}$ is:

$$\bar{d} = \frac{1}{n}\sum_{i=1}^{n} d_i$$

The average value of the amalgamated time stamp data $\bar{t}$ is:

$$\bar{t} = \frac{1}{n}\sum_{i=1}^{n} t_i$$

Step 6:

Calculate the deviations for the voice data and time stamp data for every sample in the array. Each of the deviation results are stored in its own array.

The deviation of the posterior voice data:

$$y_i - \bar{y}$$

The deviation of the posterior time stamp data:

$$q_i - \bar{q}$$

The deviation of the amalgamated voice data:

$$d_i - \bar{d}$$

The deviation of the amalgamated time stamp data:

$$t_i - \bar{t}$$

Step 7:

The RSSD of the posterior voice data is:

$$RSSD_y = \sqrt{\Sigma_{i=1}^{n}(y_i-\bar{y})^2}$$

The RSSD of the posterior time stamp data is:

$$RSSD_q = \sqrt{\Sigma_{i=1}^{n}(q_i-\bar{q})^2}$$

The RSSD of the amalgamated voice data is:

$$RSSD_d = \sqrt{\Sigma_{i=1}^{n}(d_i-\bar{d})^2}$$

The RSSD of the amalgamated time stamp data is:

$$RSSD_t = \sqrt{\Sigma_{i=1}^{n}(t_i-\bar{t})^2}$$

Step 8:

The covariation of anterior voice data and amalgamated voice data is:

$$SCPD_{xd} = \sum_{i=1}^{n} [(x_i - \bar{x})(d_i - \bar{d})]$$

The covariation of posterior voice data and amalgamated voice data is:

$$SCPD_{yd} = \sum_{i=1}^{n} [(y_i - \bar{y})(d_i - \bar{d})]$$

The covariation of anterior time stamp data and amalgamated time stamp data is:

$$SCPD_{pt} = \sum_{i=1}^{n} [(p_i - \bar{p})(t_i - \bar{t})]$$

The covariation of posterior time stamp data and amalgamated time stamp data is:

$$SCPD_{qt} = \sum_{i=1}^{n} [(q_i - \bar{q})(t_i - \bar{t})]$$

Step 9:

The Pearson's correlation coefficient, r, is a statistical analysis technique used in this embodiment to check if there is a match between the anterior and posterior voice data. The coefficient is a single decimal value between −1 and 0 and +1. If the coefficient is greater than 0 and less than or equal to +1, there is a positive correlation between two sets of data. If the coefficient is less than 0 and greater than or equal to −1, there is a negative correlation between two sets of data. If the coefficient is 0, there is no correlation (or zero correlation) between the two data sets. In the firmware, only results that are either a positive correlation or zero correlation will be accepted. Negative correlation results are not used.

Possible Values of the r Coefficient:

$$r = \begin{cases} +1 & \text{(positive correlation or good match)} \\ 0 & \text{(zero correlation or no match)} \\ -1 & \text{(negative correlation or mismatch)} \end{cases}$$

The r coefficient for the correlation between anterior voice data and amalgamated voice data is:

$$r_{xd} = \frac{\sum_{i=1}^{n} [(x_i - \bar{x})(d_i - \bar{d})]}{\sqrt{\sum_{i=1}^{n} (x_i - \bar{x})^2} \cdot \sqrt{\sum_{i=1}^{n} (d_i - \bar{d})^2}}$$

The r coefficient for the correlation between posterior voice data and amalgamated voice data is:

$$r_{yd} = \frac{\sum_{i=1}^{n} [(y_i - \bar{y})(d_i - \bar{d})]}{\sqrt{\sum_{i=1}^{n} (y_i - \bar{y})^2} \cdot \sqrt{\sum_{i=1}^{n} (d_i - \bar{d})^2}}$$

The r coefficient for the correlation between anterior time stamp data and amalgamated time stamp data is:

$$r_{pt} = \frac{\sum_{i=1}^{n} [(p_i - \bar{p})(t_i - \bar{t})]}{\sqrt{\sum_{i=1}^{n} (p_i - \bar{p})^2} \cdot \sqrt{\sum_{i=1}^{n} (t_i - \bar{t})^2}}$$

The r coefficient for the correlation between posterior time stamp data and amalgamated time stamp data is:

$$r_{qt} = \frac{\sum_{i=1}^{n} [(q_i - \bar{q})(t_i - \bar{t})]}{\sqrt{\sum_{i=1}^{n} (q_i - \bar{q})^2} \cdot \sqrt{\sum_{i=1}^{n} (t_i - \bar{t})^2}}$$

Step 10:

The four Pearson's correlation coefficients are used to determine if there is a match between two voice signals—reference signal (anterior data) and received signal (posterior data). Together the reference and received signals are the two source signals processed to create the amalgamated signal (as represented by the amalgamated data array). The objective at this point is to decide which of the two source signals is dominant. A characteristic of a dominant signal is an array with samples containing mostly very high or extremely low values, which can drastically change the envelope of the amalgamated signal. The amalgamated signal is never considered dominant, because it has absorbed the essence of both source signals. This dominant characteristic serves to highlight the difference between the two source signals. However, if both the reference and received signals are both dominant, then the values in the amalgamated signal will closely resemble the sources. That is to say the differences between the two source signals is minute.

There are four possible outcomes (applies to voice data and time stamp data):
1. If $r_{xd} \neq r_{yd}$, then neither the anterior nor the posterior voice data is dominant, which implies no match between the reference voice signal and the received voice signal. There is no correlation between the amalgamated, anterior, and posterior voice data.
2. If $r_{xd} > r_{yd}$, then the anterior voice data is dominant, which implies no match between the reference voice signal and the received voice signal. There is a weak correlation between the amalgamated, anterior, and posterior voice data; but, the amalgamated voice data has a high correlation to the anterior voice data.
3. If $r_{xd} < r_{yd}$, then the posterior voice data is dominant, which implies no match between the reference voice signal and the received voice signal. There is a weak correlation between the amalgamated, anterior, and posterior voice data; but, the amalgamated voice data has a high correlation to the posterior voice data.

4. If $r_{xd}=r_{yd}$, then both anterior and posterior voice data are dominant, which implies a perfect match between the reference voice signal and the received voice signal. A strong correlation exists between the amalgamated, anterior, and posterior voice data. However, a good match, $r_{xd} r_{yd}$, is sufficient in practice.

Since the voice signals are non-linear and non-periodic in the time domain, comparing one correlation coefficient value with another to find $r_{xd}=r_{yd}$ is difficult. Even a comparison to find $r_{xd}\approx r_{yd}$ is hard, because there is no way to define a suitable tolerance value between the two correlation coefficients for a good match. Therefore, the correlation coefficients $r_{xd}$ and $r_{yd}$ are compared against a fixed threshold value defined in terms of a percentage. The higher the threshold value, the greater the certainty of a good match between the two voice signals. Similarly, the correlation coefficients $r_{pt}$ and $r_{qt}$ are also compared to a fixed threshold value in percentage in the same manner. A good match indicates that the phase difference between two voice signals is small.

The correlation coefficient value is set to 0% if negative; else, the correlation coefficient is multiplied by 100 so that the result will be in percentage. The threshold values are set to a value between 1% to 100%. The decision logic is based on the practical understanding that voice signal is often unpredictable in a noisy environment. The thresholds used in the tables below are examples, and the skilled person will appreciate that they can be changed to suit the local environment.

| Voice threshold (%) | Time stamp threshold (%) | | |
| --- | --- | --- | --- |
| | $(r_{pt} \geq 55) \cap (r_{qt} \geq 55)$ | $(r_{pt} \geq 50) \cap (r_{qt} \geq 50)$ | $(r_{pt} \geq 45) \cap (r_{qt} \geq 45)$ |
| $(r_{xd} \geq 70) \cap (r_{yd} \geq 70)$ | Accept | Reject | Reject |
| $(r_{xd} \geq 60) \cap (r_{yd} \geq 60)$ | Accept | Accept | Reject |
| $(r_{xd} \geq 50) \cap (r_{yd} \geq 50)$ | Accept | Accept | Accept |

By segmenting the threshold values, the voice recognition apparatus can differentiate if the user's voice is close or near or far from the original recording location.

| Voice threshold (%) | Time stamp threshold (%) | | |
| --- | --- | --- | --- |
| | $(r_{pt} \geq 55) \cap (r_{qt} \geq 55)$ | $(r_{pt} \geq 50) \cap (r_{qt} \geq 50)$ | $(r_{pt} \geq 45) \cap (r_{qt} \geq 45)$ |
| $(r_{xd} \geq 70) \cap (r_{yd} \geq 70)$ | Close | — | — |
| $(r_{xd} \geq 60) \cap (r_{yd} \geq 60)$ | Near | Near | — |
| $(r_{xd} \geq 50) \cap (r_{yd} \geq 50)$ | Far | Far | Far |

The arrangement of the decision logic using correlation coefficients and how they relate to the threshold values can be structured in any way. Alternative arrangements may yield different results in various applications.

Dual Data Stream

For dual stream data, there will be more variables involved because of the positive and negative half-cycles being used as two channels of data.

1. Convert voice signal from each Schmitt Trigger 140 to anterior voice data:
    a. Collect and store the positive anterior voice data in an array in the memory;
    b. Collect and store the negative anterior voice data in an array in the memory;
    c. Collect and store the anterior time stamp data in its own array;
    d. Calculate the average value of:
        i. the positive anterior voice data;
        ii. the negative anterior voice data;
        iii. the positive anterior time stamp data;
        iv. the negative anterior time stamp data.
    e. Calculate the deviation of:
        i. the positive anterior voice data;
        ii. the negative anterior voice data;
        iii. the positive anterior time stamp data;
        iv. the negative anterior time stamp data.
    f. Calculate the RSSD of:
        i. the positive anterior voice data;
        ii. the negative anterior voice data;
        iii. the positive anterior time stamp data;
        iv. the negative anterior time stamp data.
2. Wait for next utterance, then convert voice signal from the Schmitt Trigger to posterior voice data:
    a. Collect and store the positive posterior voice data in an array in the memory;
    b. Collect and store the negative posterior voice data in an array in the memory;
    c. Collect and store the posterior time stamp data in its own array.
3. Calculate the positive amalgamated voice data between the positive anterior and positive posterior voice data.
4. Calculate the negative amalgamated voice data between the negative anterior and negative posterior voice data.
5. Calculate the positive amalgamated time stamp data between the positive anterior and positive posterior time stamp data.
6. Calculate the negative amalgamated time stamp data between the negative anterior and negative posterior time stamp data.
7. Calculate the average value of:
    a. the positive posterior voice data;
    b. the positive posterior time stamp data;
    c. the negative posterior voice data;
    d. the negative posterior time stamp data;
    e. the positive amalgamated voice data;
    f. the positive amalgamated time stamp data;
    g. the negative amalgamated voice data;
    h. the negative amalgamated time stamp data.
8. Calculate the deviation of:
    a. the positive posterior voice data;
    b. the positive posterior time stamp data;
    c. the negative posterior voice data;
    d. the negative posterior time stamp data;
    e. the positive amalgamated voice data;
    f. the positive amalgamated time stamp data;
    g. the negative amalgamated voice data;
    h. the negative amalgamated time stamp data.
9. Calculate the RSSD of:
    a. the positive posterior voice data;
    b. the positive posterior time stamp data;
    c. the negative posterior voice data;
    d. the negative posterior time stamp data;
    e. the positive amalgamated voice data;
    f. the positive amalgamated time stamp data;
    g. the negative amalgamated voice data;
    h. the negative amalgamated time stamp data.

10. Calculate the covariation:
    a. between the positive anterior voice data and positive amalgamated voice data;
    b. between the positive posterior voice data and positive amalgamated voice data;
    c. between the negative anterior voice data and negative amalgamated voice data;
    d. between the negative posterior voice data and negative amalgamated voice data;
    e. between the positive anterior time stamp data and positive amalgamated time stamp data;
    f. between the positive posterior time stamp data and positive amalgamated time stamp data;
    g. between the negative anterior time stamp data and negative amalgamated time stamp data;
    h. between the negative posterior time stamp data and negative amalgamated time stamp data.
11. Calculate the Pearson's correlation coefficient for the:
    a. correlation between positive anterior voice data and positive amalgamated voice data;
    b. correlation between positive posterior voice data and positive amalgamated voice data;
    c. correlation between negative anterior voice data and negative amalgamated voice data;
    d. correlation between negative posterior voice data and negative amalgamated voice data;
    e. correlation between positive anterior time stamp data and positive amalgamated time stamp data;
    f. correlation between positive posterior time stamp data and positive amalgamated time stamp data;
    g. correlation between negative anterior time stamp data and negative amalgamated time stamp data;
    h. correlation between negative posterior time stamp data and negative amalgamated time stamp data.
12. Apply decision logic to the eight Pearson's correlation coefficients.

The equations will resemble those used for single data stream configuration. But there will be additional variables which should have adequate representation.

Variables:
n is the total number of samples
$x_{i+}$ is the current $i^{th}$ sample of the positive anterior voice data
$x_{i-}$ is the current $i^{th}$ sample of the negative anterior voice data
$\bar{x}_+$ is the average value of the positive anterior voice data
$\bar{x}_-$ is the average value of the negative anterior voice data
$p_{i+}$ is the current $i^{th}$ sample of the positive anterior time stamp data
$p_{i-}$ is the current $i^{th}$ sample of the negative anterior time stamp data
$\bar{p}_+$ is the average value of the positive anterior time stamp data
$\bar{p}_-$ is the average value of the negative anterior time stamp data
$y_{i+}$ is the current $i^{th}$ sample of the positive posterior voice data
$y_{i-}$ is the current $i^{th}$ sample of the negative posterior voice data
$\bar{y}_+$ is the average value of the positive posterior voice data
$\bar{y}_-$ is the average value of the negative posterior voice data
$q_{i+}$ is the current $i^{th}$ sample of the positive posterior time stamp data
$q_{i-}$ is the current $i^{th}$ sample of the negative posterior time stamp data
$\bar{q}_+$ is the average value of the positive posterior time stamp data
$\bar{q}_-$ is the average value of the negative posterior time stamp data
$d_{i+}$ is the positive amalgamated voice data for the current $i^{th}$ sample
$d_{i-}$ is the negative amalgamated voice data for the current $i^{th}$ sample
$t_{i+}$ is the positive amalgamated time stamp data for the current $i^{th}$ sample
$t_{i-}$ is the negative amalgamated time stamp data for the current $i^{th}$ sample
$RSSD_{x+}$ is the RSSD of the positive anterior voice data
$RSSD_{x-}$ is the RSSD of the negative anterior voice data
$RSSD_{p+}$ is the RSSD of the positive anterior time stamp data
$RSSD_{p-}$ is the RSSD of the negative anterior time stamp data
$RSSD_{y+}$ is the RSSD of the positive posterior voice data
$RSSD_{y-}$ is the RSSD of the negative posterior voice data
$RSSD_{q+}$ is the RSSD of the positive posterior time stamp data
$RSSD_{q-}$ is the RSSD of the negative posterior time stamp data
$RSSD_{d+}$ is the RSSD of the positive amalgamated voice data
$RSSD_{d-}$ is the RSSD of the negative amalgamated voice data
$RSSD_{t+}$ is the RSSD of the positive amalgamated time stamp data
$RSSD_{t-}$ is the RSSD of the negative amalgamated time stamp data
$SCPD_{xd+}$ is the covariation of positive anterior voice data and positive amalgamated voice data
$SCPD_{xd-}$ is the covariation of negative anterior voice data and negative amalgamated voice data
$SCPD_{yd+}$ is the covariation of positive posterior voice data and positive amalgamated voice data
$SCPD_{yd-}$ is the covariation of negative posterior voice data and negative amalgamated voice data
$SCPD_{pt+}$ is the covariation of positive anterior time stamp data and positive amalgamated time stamp data
$SCPD_{pt-}$ is the covariation of negative anterior time stamp data and negative amalgamated time stamp data
$SCPD_{qt+}$ is the covariation of positive posterior time stamp data and positive amalgamated time stamp data
$SCPD_{qt-}$ is the covariation of negative posterior time stamp data and negative amalgamated time stamp data
$r_{xd+}$ is the Pearson's correlation coefficient for positive anterior voice data and positive amalgamated voice data
$r_{xd-}$ is the Pearson's correlation coefficient for negative anterior voice data and negative amalgamated voice data
$r_{yd+}$ is the Pearson's correlation coefficient for positive posterior voice data and positive amalgamated voice data
$r_{yd-}$ is the Pearson's correlation coefficient for negative posterior voice data and negative amalgamated voice data
$r_{pt+}$ is the Pearson's correlation coefficient for positive anterior time stamp data and positive amalgamated time stamp data
$r_{pt-}$ is the Pearson's correlation coefficient for negative anterior time stamp data and negative amalgamated time stamp data
$r_{qt+}$ is the Pearson's correlation coefficient for positive posterior time stamp data and positive amalgamated time stamp data $r_{qt-}$ is the Pearson's correlation coefficient for negative posterior time stamp data and negative amalgamated time stamp data In an alternative embodiment, single time stamp data may be shared between positive anterior voice data and negative anterior voice data. Similarly, the same time stamp data may be shared between positive posterior voice data and negative posterior voice data. Instead of having four individualized time stamp arrays, the number of arrays can be reduced to two. So $p_{i+}=p_{i-}$ and $q_{i+}=q_{i-}$. This embodiment simplifies the data collection and processing tasks in the firmware. The calculations remain the same.

In an embodiment, the decision logic used in the single data stream is adapted by extending another set of thresholds for the additional correlation coefficients. Using both the positive and negative correlation coefficients gives more latitude for precision, but at a cost of computing time and effort. Again, the skilled person will appreciate that the thresholds used in the tables below are just examples, and can be changed to suit any environment.

| | Positive time stamp threshold (%) | | |
|---|---|---|---|
| Positive voice threshold (%) | $(r_{pt+} \geq 55) \cap$ $(r_{qt+} \geq 55)$ | $(r_{pt+} \geq 50) \cap$ $(r_{qt+} \geq 50)$ | $(r_{pt+} \geq 45) \cap$ $(r_{qt+} \geq 45)$ |
| $(r_{xd+} \geq 70) \cap$ $(r_{yd+} \geq 70)$ | Accept | Reject | Reject |
| $(r_{xd+} \geq 60) \cap$ $(r_{yd+} \geq 60)$ | Accept | Accept | Reject |
| $(r_{xd+} \geq 50) \cap$ $(r_{yd+} \geq 50)$ | Accept | Accept | Accept |

| | Negative time stamp threshold (%) | | |
|---|---|---|---|
| Negative voice threshold (%) | $(r_{pt-} \geq 55) \cap$ $(r_{qt-} \geq 55)$ | $(r_{pt-} \geq 50) \cap$ $(r_{qt-} \geq 50)$ | $(r_{pt-} \geq 45) \cap$ $(r_{qt-} \geq 45)$ |
| $(r_{xd-} \geq 70) \cap$ $(r_{yd-} \geq 70)$ | Accept | Reject | Reject |
| $(r_{xd-} \geq 60) \cap$ $(r_{yd-} \geq 60)$ | Accept | Accept | Reject |
| $(r_{xd-} \geq 50) \cap$ $(r_{yd-} \geq 50)$ | Accept | Accept | Accept |

In an alternative embodiment, the following method is used to reduce the number or coefficients. This method allows the number of correlation coefficients to be combined (or condensed) into a similar number used in the single data stream configuration. Again, the threshold values are given as examples. In one example the coefficients are combined to produce new coefficients as follows:

$$r_{zd+} = 100 \sqrt{r_{xd+} \cdot r_{yd+}}$$

$$r_{zd-} = 100 \sqrt{r_{xd-} \cdot r_{yd-}}$$

$$r_{zt+} = 100 \sqrt{r_{pt+} \cdot r_{qt+}}$$

$$r_{zt+} = 100 \sqrt{r_{pt+} \cdot r_{qt+}}$$

| | Combined time stamp threshold (%) | | |
|---|---|---|---|
| Combined voice threshold (%) | $(r_{zt+} \geq 55) \cap$ $(r_{zt-} \geq 55)$ | $(r_{zt+} \geq 50) \cap$ $(r_{zt-} \geq 50)$ | $(r_{zt+} \geq 45) \cap$ $(r_{zt-} \geq 45)$ |
| $(r_{zd+} \geq 70) \cap$ $(r_{zd-} \geq 70)$ | Accept | Reject | Reject |
| $(r_{zd+} \geq 60) \cap$ $(r_{zd-} \geq 60)$ | Accept | Accept | Reject |
| $(r_{zd+} \geq 50) \cap$ $(r_{zd-} \geq 50)$ | Accept | Accept | Accept |

The skilled person will appreciate that arrangement of the decision logic for dual data stream can be structured other ways, for example by using the combined correlation coefficients with the regular single data stream correlation coefficients.

Raw Data Stream

For the raw data stream configuration, the method is similar to the single data stream. Every sample from the ADC is stored in an array, and processing cannot begin until all samples are collected. Each sample will also have its own corresponding time stamp data. The number of samples used in a recording the voice data and time stamp data must be the same; and, the array size for the voice data and time stamp data must also be the same. The decision logic may be implemented in a similar manner to the single data stream, and again it is customisable.

Applications and Modifications

In one embodiment, the voice recognition apparatus 100 can be used to solve the problem of finding lost objects. An utterance is recorded and stored in the apparatus. The apparatus can be attached to a valuable object or placed in a specific location. Whenever the utterance is detected, the apparatus will announce its presence with a suitable indicator 190, for example by outputting sound via a speaker, turning on a light or a combination thereof.

In an alternative embodiment, several apparatus can be used to record an utterance at different distances from the user, e.g. over separation of one metre. All the apparatuses are attached to an object or location. Whenever the utterance is detected at any distance within one metre, one of the apparatuses will trigger its indicator.

In another embodiment, the voice recognition apparatus 100 is combined with a wireless networking module and connected to a wireless network (such as Bluetooth or Wi-Fi or cellular) to share a recorded utterance with other similarly networked apparatuses owned by the user or group of users. When the utterance is detected and recognised, it will trigger a designated apparatus at a different location to tell other users the remote apparatus' owner has spoken. It will be appreciated that in such networked embodiments the anterior data may be produced, for example, at another device.

The voice recognition apparatus can be used with a smartphone app to detect the apparatus' sound indicator (as a beep or a melody) in order to complete a task or perform an action in the smartphone itself. Alternatively, the smartphone app could generate specific sounds for the voice recognition apparatus to detect and indicate its presence or perform a task.

The voice recognition apparatus can be embedded into the circuitry of third-party products to allow for voice-activated functionality. The third-party products may be electronic or electromechanical applications. The utterance detected by the embedded apparatus will send an electrical signal or specified data to the main processor of the third-party product for processing. Any customisable action can result from the utterance, limited by the third-party product's design. Examples of possible third-party products are security access, car door access, voice-controlled children's toys, voice-activated location tracker, voice-controlled collar for dogs, voice-activated home appliance, pet voice trainer, voice-activated mechanical pencil, and many more.

The voice recognition apparatus may be combined with a wireless networking module and placed at various indoor locations of a building to detect the presence of certain individuals when they speak. The specific utterance to be detected from an individual would be stored in multiple network-enabled apparatus. As the individual passes any one of the numerous apparatus and say the utterance, the apparatus will trigger and report wirelessly back to a central office.

The voice recognition apparatus could be implemented using only its mathematical component (with or without data compression) in software for a computer system with unlimited memory. It could be configured to recognise speech instead of an utterance. Samples of speech to be detected may be in the form of broadcast speech, lyrics, or dialogue. A separate database associated with storing anterior data for specific speech patterns enables the apparatus to recognise the context of the speech.

The voice recognition apparatus may be used as a portable tool for teaching languages. Pre-recorded pronunciation of words in a local language are stored in the memory of the apparatus. When the student pronounces a word, the apparatus will indicate whether the word was spoken correctly or not.

The voice recognition apparatus may be modified to work with a computer application to provide transcription services, by converting recognised words and transcribing it into text. The hardware of the apparatus may be incorporated into the computer or remain as a standalone device connected to the computer via USB port or wireless network. In the computer application, the software is configured to communicate with a database of words linked to the another database of acoustic signatures. These databases will be consulted whenever the apparatus detects and recognises an utterance. The output from the apparatus may be transmitted over the network to the Internet, or adapted into a separate computer application.

In another embodiment, the voice recognition apparatus is embedded within the circuitry or software of nodes that make up a wireless sensor network and deployed in the field (e.g. forest, jungle, savannah, etc.) The apparatus would be considered as another sensor in the wireless sensor network. Multiple automated sensor nodes would look out for animal or bird or insect sounds that needs to be tracked within an area of interest. The results are sent back to the base camp for field researchers to analyse.

Advantages and Benefits of Embodiments of the Invention

In some embodiments, the simplicity of the statistical analysis allows the mathematical operations to work faster and more efficiently in a low-power, resource-limited embedded system. In some embodiments, less than 40 Bytes for both voice data and time stamp data is sufficient to find a signal match, because the statistical analysis is constrained by the number of samples recorded from the voice signal. However, more available voice data and time stamp data will improve the process.

The statistical analysis method for signal matching is advantageous for non-linear, non-periodic signals in the time domain.

The voice compression method is a memory space saving design that works with the statistical analysis method. This also enables the statistical analysis to process the data much quicker. Even though the information is compressed, the data of the spoken word by every person is unique. The voice compression works with the feature extraction process to allow unique voice signals to be converted into data. The voice recognition apparatus will still work without the voice compression, but will require more memory storage.

A further advantage is that training phase (i.e. requiring multiple recordings of the sound desired to be matched) is not required for the voice recognition apparatus to detect and recognise an utterance, because the statistical analysis is concerned with the data. It is not concerned with how the frequencies in the signal vary with phone, phoneme, or semantic structure of the spoken word.

While the voice recognition apparatus is primarily designed for 8-bit embedded systems, but it can be applied in computer systems of any architecture and bit size. It can also be a standalone high-level software application or embedded within another application.

The apparatus is optimised for handling short voice signals. If the voice signal is long and continuous, then processing cannot start until all the data is collected. However, by segmenting the voice signal, the voice data can be processed by segment. As the voice signal is received and buffered continuously, patterns in the apportioned signal would be detected in sequence.

It will be understood to persons skilled in the art of the invention that many modifications may be made without departing from the spirit and scope of the invention. In particular, it will be apparent that certain features of embodiments of the invention can be employed to form further embodiments.

Herein the term "processor" is used to refer generically to any device that can process computer readable instructions and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs. Such processors are sometimes also referred to as central processing units (CPUs). Most processors are general purpose units, however, it is also known to provide a specific purpose processor, for example, an application specific integrated circuit (ASIC) or a field programmable gate array (FPGA).

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A sound recognition method comprising:
capturing a posterior sound signal;
processing the posterior sound signal to derive posterior data;

generating amalgamated data from the posterior data and anterior data derived from a previously captured anterior sound signal; and determining whether there are correlations between the amalgamated data, the posterior data, and the anterior data that indicate that the posterior data matches the anterior data by comparing the posterior data and the amalgamated data, and the anterior data and the amalgamated data; and upon the posterior data matching the anterior data, outputting an indication that the posterior data matches the anterior data, wherein the posterior data comprises posterior sound data and posterior time stamp data, and the anterior data comprises anterior sound data and anterior time stamp data.

2. The method as claimed in claim 1, wherein generating amalgamated data comprises:

generating amalgamated sound data from the posterior sound data and the anterior sound data; and generating amalgamated time stamp data from the posterior time stamp data and the anterior time stamp data.

3. The method as claimed in claim 2, wherein comparing the posterior data and the amalgamated data, and the anterior data and the amalgamated data comprises generating correlation coefficients between:

amalgamated sound data and the posterior sound data;
amalgamated sound data and the anterior sound data;
amalgamated time stamp data and the posterior time stamp data;
amalgamated time stamp data and the anterior time stamp data.

4. The method as claimed in claim 3, wherein the correlation coefficients are Pearson's coefficients.

5. The method as claimed in claim 3, comprising applying decision logic based on the generated coefficients to determine whether there are correlations between the amalgamated data, the posterior data, and the anterior data that indicate that the posterior data matches the anterior data.

6. The method as claimed in claim 1, wherein processing the captured posterior sound signal to derive posterior data comprises converting the captured signal into a square wave signal.

7. The method as claimed in claim 6, comprising processing the square wave signal to:

derive posterior sound data by storing a binary representation of transitions in the square wave signal; and derive posterior time stamp data by storing data indicative of the time between transitions.

8. A sound recognition method comprising:
capturing a posterior sound signal;
processing the posterior sound signal to derive posterior data;
generating amalgamated data from the posterior data and anterior data derived from a previously captured anterior sound signal; and
determining whether there are correlations between the amalgamated data, the posterior data, and the anterior data that indicate that the posterior data matches the anterior data by comparing the posterior data and the amalgamated data, and the anterior data and the amalgamated data; and
upon the posterior data matching the anterior data, outputting an indication that the posterior data matches the anterior data, wherein:
the posterior data comprises positive posterior sound data, negative posterior sound data, positive posterior time stamp data and negative posterior time stamp data, and the anterior data comprises positive anterior sound data, negative anterior sound data, positive anterior time stamp data and negative anterior time stamp data.

9. The method as claimed in claim 8, wherein generating amalgamated data comprises:

generating amalgamated positive sound data from the positive posterior sound data and the positive anterior sound data;

generating amalgamated negative sound data from the negative posterior sound data and the negative anterior sound data;

generating amalgamated positive time stamp data from the positive posterior time stamp data and the positive anterior time stamp data; and generating amalgamated negative time stamp data from the negative posterior time stamp data and the negative anterior time stamp data.

10. The method as claimed in claim 9, wherein comparing the posterior data and the amalgamated data, and the anterior data and the amalgamated data comprises generating correlation coefficients between:

amalgamated positive sound data and the positive posterior sound data;
amalgamated positive sound data and the positive anterior sound data;
amalgamated negative sound data and the negative posterior sound data; and
amalgamated negative sound data and the negative anterior sound data.

11. The method as claimed in claim 10, wherein comparing the posterior data and the amalgamated data, and the anterior data and the amalgamated data comprises generating correlation coefficients between:

amalgamated positive time stamp data and the positive posterior time stamp data;
amalgamated positive time stamp data and the positive anterior time stamp data;
amalgamated negative time stamp data and the negative posterior time stamp data; and
amalgamated negative time stamp data and the negative anterior time stamp data.

12. The method as claimed in claim 11, comprising generating further correlation coefficients from the correlation coefficients representing:

the amalgamated positive time stamp data and the positive posterior time stamp data, and the amalgamated positive time stamp data and the positive anterior time stamp data;

the amalgamated negative time stamp data and the negative posterior time stamp data, and the amalgamated negative time stamp data and the negative anterior time stamp data;

the amalgamated positive sound data and the positive posterior sound data, and the amalgamated positive sound data and the positive anterior sound data; and the amalgamated negative sound data and the negative posterior sound data, and the amalgamated negative sound data and the negative anterior sound data.

13. The method as claimed in claim 10, wherein the correlation coefficients are Pearson's coefficients.

14. The method as claimed in claim 10, comprising applying decision logic based on the generated coefficients to determine whether there are correlations between the amalgamated data, the posterior data, and the anterior data that indicate that the posterior data matches the anterior data.

15. The method as claimed in claim 8, wherein processing the captured posterior sound signal comprises converting the positive half-cycle of the posterior sound signal into a first square wave signal, and the negative half-cycle of the posterior sound signal into a second square wave signal.

16. The method as claimed in claim 15, comprising:
processing the first square wave signal to
derive positive posterior sound data by storing a binary representation of transitions in the square wave signal to form, and
derive positive posterior time stamp data by storing data indicative of the time between transitions; and
processing the second square wave signal to
derive negative posterior sound data by storing a binary representation of transitions in the square wave signal to form, and
derive negative posterior time stamp data by storing data indicative of the time between transitions.

17. The sound recognition apparatus comprising:
a microphone for capturing a posterior sound signal; and
a processing circuit comprising a processor, the processing circuit configured to:
process the posterior sound signal to derive posterior data;
generate, using the processor, amalgamated data from the posterior data and anterior data derived from a previously captured anterior signal; and
determine, by the processor, whether there are correlations between the amalgamated data, the posterior data, and the anterior data that indicate that the posterior data matches the anterior data by comparing the posterior data and the amalgamated data, and the anterior data and the amalgamated data; and
upon the posterior data matching the anterior data, output, by the processor, an indication that the posterior data matches the anterior data; and
an indicator for outputting the indication, wherein the posterior data comprises posterior sound data and posterior time stamp data, and the anterior data comprises anterior sound data and anterior time stamp data.

18. The sound recognition apparatus as claimed in claim 17, wherein generating amalgamated data comprises the processor:
generating amalgamated sound data from the posterior sound data and the anterior sound data; and
generating amalgamated time stamp data from the posterior time stamp data and the anterior time stamp data.

19. The sound recognition apparatus as claimed in claim 18, wherein comparing the posterior data and the amalgamated data, and the anterior data and the amalgamated data comprises the processor generating correlation coefficients between:
amalgamated sound data and the posterior sound data;
amalgamated sound data and the anterior sound data;
amalgamated time stamp data and the posterior time stamp data;
amalgamated time stamp data and the anterior time stamp data.

20. The sound recognition apparatus as claimed in claim 19, wherein the correlation coefficients are Pearson's coefficients.

21. The sound recognition apparatus as claimed in claim 19, wherein the processor is configured to apply decision logic based on the generated coefficients to determine whether there are correlations between the amalgamated data, the posterior data, and the anterior data that indicate that the posterior data matches the anterior data.

22. The sound recognition apparatus as claimed in claim 17, the processing circuit comprises circuitry arranged to convert the captured signal into a square wave signal for processing by the processor.

23. The sound recognition apparatus as claimed in claim 22, wherein the circuitry comprises a Schmitt Trigger circuit.

24. The sound recognition apparatus as claimed in claim 22, comprising a high-pass filter for high-pass filtering the captured signal and an amplifier for amplifying the high-pass filtered signal before the captured signal is converted into a square wave signal.

25. The sound recognition apparatus as claimed in claim 22, wherein the processor processes the square wave signal to:
derive posterior sound data by storing a binary representation of transitions in the square wave signal; and
derive posterior time stamp data by storing data indicative of the time between transitions.

26. A sound recognition apparatus comprising:
a microphone for capturing a posterior sound signal;
a processing circuit comprising a processor, the processing circuit configured to:
process the posterior sound signal to derive posterior data;
generate, using the processor, amalgamated data from the posterior data and anterior data derived from a previously captured anterior signal; and
determine, by the processor, whether there are correlations between the amalgamated data, the posterior data, and the anterior data that indicate that the posterior data matches the anterior data by comparing the posterior data and the amalgamated data, and the anterior data and the amalgamated data; and
upon the posterior data matching the anterior data, output, by the processor, an indication that the posterior data matches the anterior data; and
an indicator for outputting the indication, wherein the posterior data comprises positive posterior sound data, negative posterior sound data, positive posterior time stamp data and negative posterior time stamp data, and the anterior data comprises positive anterior sound data, negative anterior sound data, positive anterior time stamp data and negative anterior time stamp data.

27. The sound recognition apparatus as claimed in claim 26, wherein generating amalgamated data comprises the processor:
generating amalgamated positive sound data from the positive posterior sound data and the positive anterior sound data;
generating amalgamated negative sound data from the negative posterior sound data and the negative anterior sound data;
generating amalgamated positive time stamp data from the positive posterior time stamp data and the positive anterior time stamp data; and
generating amalgamated negative time stamp data from the negative posterior time stamp data and the negative anterior time stamp data.

28. The sound recognition apparatus as claimed in claim 27, wherein comparing the posterior data and the amalgamated data, and the anterior data and the amalgamated data comprises the processor generating correlation coefficients between:
amalgamated positive sound data and the positive posterior sound data;

amalgamated positive sound data and the positive anterior sound data;

amalgamated negative sound data and the negative posterior sound data; and amalgamated negative sound data and the negative anterior sound data.

29. The sound recognition apparatus as claimed in claim 28, wherein comparing the posterior data and the amalgamated data, and the anterior data and the amalgamated data comprises the processor generating correlation coefficients between:

amalgamated positive time stamp data and the positive posterior time stamp data;

amalgamated positive time stamp data and the positive anterior time stamp data;

amalgamated negative time stamp data and the negative posterior time stamp data; and amalgamated negative time stamp data and the negative anterior time stamp data.

30. The sound recognition apparatus as claimed in claim 29, wherein the processor generates further correlation coefficients from the correlation coefficients representing:

the amalgamated positive time stamp data and the positive posterior time stamp data, and the amalgamated positive time stamp data and the positive anterior time stamp data;

the amalgamated negative time stamp data and the negative posterior time stamp data, and the amalgamated negative time stamp data and the negative anterior time stamp data;

the amalgamated positive sound data and the positive posterior sound data, and the amalgamated positive sound data and the positive anterior sound data; and the amalgamated negative sound data and the negative posterior sound data, and the amalgamated negative sound data and the negative anterior sound data.

31. The sound recognition apparatus as claimed in claim 28, wherein the correlation coefficients are Pearson's coefficients.

32. The sound recognition apparatus as claimed in claim 28, wherein the processor is configured to apply decision logic based on the generated coefficients to determine whether there are correlations between the amalgamated data, the posterior data, and the anterior data that indicate that the posterior data matches the anterior data.

33. The sound recognition apparatus as claimed in claim 26, wherein the processing circuit comprises circuitry arranged to convert the positive half-cycle of the posterior sound signal into a first square wave signal, and the negative half-cycle of the posterior sound signal into a second square wave signal.

34. The sound recognition apparatus as claimed in claim 33, wherein the circuitry comprises a first Schmitt Trigger circuit for converting the positive half-cycle and a second Schmitt Trigger circuit for converting the negative half-cycle.

35. The sound recognition apparatus as claimed in claim 33 comprising:

a first high-pass filter for high-pass filtering the positive half-cycle of the captured signal and a first amplifier for amplifying the high-pass filtered positive half-cycle of the captured signal before the positive half-cycle of the captured signal is converted into the first square wave signal; and a second high-pass filter for high-pass filtering the negative half-cycle of the captured signal and a second amplifier for amplifying the high-pass filtered negative half-cycle of the captured signal before the negative half-cycle of the captured signal is converted into the second square wave signal.

36. The sound recognition apparatus as claimed in claim 33, wherein the processor:

processes the first square wave signal to derive positive posterior sound data by storing a binary representation of transitions in the square wave signal to form, and derive positive posterior time stamp data by storing data indicative of the time between transitions; and processes the second square wave signal to derive negative posterior sound data by storing a binary representation of transitions in the square wave signal to form, and derive negative posterior time stamp data by storing data indicative of the time between transitions.

* * * * *